US010293777B2

United States Patent
Paxton et al.

(10) Patent No.: US 10,293,777 B2
(45) Date of Patent: May 21, 2019

(54) MULTI-CUSHION AIRBAG ASSEMBLIES FOR REDUCING ROTATIONAL VELOCITY OF AN OCCUPANT'S HEAD

(71) Applicant: Autoliv ASP, Inc., Ogden, UT (US)

(72) Inventors: Donald James Paxton, Romeo, MI (US); Jaeho Cho, Southfield, MI (US)

(73) Assignees: Autoliv ASP, Inc., Ogden, UT (US); Ford Global Technologies, LLC, Dearborn, MI (US)

( * ) Notice: Subject to any disclaimer, the term of this patent is extended or adjusted under 35 U.S.C. 154(b) by 210 days.

(21) Appl. No.: 15/249,041

(22) Filed: Aug. 26, 2016

(65) Prior Publication Data
US 2018/0056920 A1    Mar. 1, 2018

(51) Int. Cl.
*B60R 21/233* (2006.01)
*B60R 21/239* (2006.01)
*B60R 21/00* (2006.01)
*B60R 21/231* (2011.01)

(52) U.S. Cl.
CPC .......... *B60R 21/233* (2013.01); *B60R 21/239* (2013.01); *B60R 21/231* (2013.01); *B60R 2021/0048* (2013.01); *B60R 2021/0058* (2013.01); *B60R 2021/23308* (2013.01)

(58) Field of Classification Search
CPC ................ B60R 21/233; B60R 21/231; B60R 2021/23308
See application file for complete search history.

(56) References Cited

U.S. PATENT DOCUMENTS

| | | | |
|---|---|---|---|
| 3,614,129 A | 10/1971 | Sobkow | |
| 3,642,303 A | 2/1972 | Irish et al. | |
| 3,768,830 A | 10/1973 | Hass | |
| 3,801,126 A | 4/1974 | Knight, IV et al. | |
| 4,043,572 A | 8/1977 | Hattori et al. | |
| 4,262,931 A * | 4/1981 | Strasser | B60R 21/233 280/729 |
| 5,556,128 A | 9/1996 | Sinnhuber | |
| 5,575,497 A * | 11/1996 | Suyama | B60R 21/231 280/730.1 |
| 5,586,782 A | 12/1996 | Zimmerman, II | |
| 5,609,363 A | 3/1997 | Finelli | |

(Continued)

FOREIGN PATENT DOCUMENTS

DE    10146493 A1    4/2003
DE    102010019592 A1    11/2011
(Continued)

OTHER PUBLICATIONS

International Search Report and Written Opinion for PCT/US2014/067283 dated Feb. 20, 2015.
(Continued)

*Primary Examiner* — Karen Beck
(74) *Attorney, Agent, or Firm* — Stoel Rives LLP

(57) ABSTRACT

Airbag assemblies can reduce rotational velocity of an occupant's head during a collision event. Some airbag assemblies include a first airbag cushion that is disposed forward of an occupant and a second airbag cushion that is disposed generally lateral to the occupant. When the occupant moves in an oblique direction during a collision event, the second airbag cushion may contact the head of the occupant and reduce its rotational velocity.

18 Claims, 15 Drawing Sheets

(56) References Cited

U.S. PATENT DOCUMENTS

| | | |
|---|---|---|
| 5,697,641 A | 12/1997 | McGee et al. |
| 5,791,685 A | 8/1998 | Lachat et al. |
| 5,803,485 A | 9/1998 | Acker et al. |
| 5,839,755 A | 11/1998 | Turnbull |
| 5,853,191 A | 12/1998 | Lachat et al. |
| 5,945,184 A | 8/1999 | Nagata |
| 6,123,355 A | 9/2000 | Sutherland |
| 6,126,196 A | 10/2000 | Zimmerman |
| 6,135,493 A | 10/2000 | Jost et al. |
| 6,139,052 A | 10/2000 | Preamprasitchai |
| 6,158,765 A | 12/2000 | Sinnhuber et al. |
| 6,196,575 B1 | 3/2001 | Ellerbrok et al. |
| 6,247,727 B1 | 6/2001 | Hamada |
| 6,254,121 B1 | 7/2001 | Fowler et al. |
| 6,308,983 B1 | 10/2001 | Sinnhuber |
| 6,419,262 B1 | 7/2002 | Fendt et al. |
| 6,431,586 B1 | 8/2002 | Eyrainer et al. |
| 6,648,371 B2 | 11/2003 | Vendely |
| 6,786,505 B2 | 9/2004 | Yoshida et al. |
| 6,971,664 B2 | 12/2005 | Amamori et al. |
| 7,040,650 B2 | 5/2006 | Neupert et al. |
| 7,261,320 B2 | 8/2007 | Fredin et al. |
| 7,347,450 B2 | 3/2008 | Williams et al. |
| 7,475,904 B2 | 1/2009 | Hofmann et al. |
| 7,571,929 B2 | 8/2009 | Fukawatase et al. |
| 7,726,685 B2 | 6/2010 | Abe et al. |
| 7,850,200 B2 | 12/2010 | Zauritz et al. |
| 7,938,445 B2 | 5/2011 | Smith et al. |
| 7,942,443 B2 | 5/2011 | Dennis et al. |
| 7,988,188 B2 | 8/2011 | Zauritz et al. |
| 8,186,713 B2 | 5/2012 | Fischer et al. |
| 8,215,665 B2 | 7/2012 | Ohara et al. |
| 8,567,817 B2 | 10/2013 | Yamamoto |
| 8,573,641 B2 | 11/2013 | Marable et al. |
| 8,596,678 B2 | 12/2013 | Ravenberg et al. |
| 8,882,138 B1 * | 11/2014 | Hicken ............... B60R 21/231 280/730.1 |
| 9,248,799 B2 * | 2/2016 | Schneider ............ B60R 21/205 |
| 9,272,684 B1 | 3/2016 | Keyser et al. |
| 9,376,084 B2 * | 6/2016 | Choi ................... B60R 21/233 |
| 9,522,648 B2 * | 12/2016 | Fukawatase ......... B60R 21/233 |
| 10,059,299 B2 * | 8/2018 | Yamada ............... B60R 21/205 |
| 2003/0094794 A1 | 5/2003 | Amamori |
| 2003/0193174 A1 | 10/2003 | Abe |
| 2003/0209895 A1 | 11/2003 | Gu |
| 2003/0218325 A1 | 11/2003 | Hasebe et al. |
| 2004/0046369 A1 | 3/2004 | Michael et al. |
| 2004/0090054 A1 | 5/2004 | Bossecker et al. |
| 2004/0145161 A1 | 7/2004 | Hasebe et al. |
| 2005/0029781 A1 | 2/2005 | Enders et al. |
| 2005/0104339 A1 | 5/2005 | Hasebe et al. |
| 2005/0110249 A1 | 5/2005 | Hasebe |
| 2005/0184489 A1 | 8/2005 | Kobayashi |
| 2005/0269808 A1 | 12/2005 | Song et al. |
| 2006/0006631 A1 | 1/2006 | Meissner et al. |
| 2006/0175809 A1 | 8/2006 | Yamaji et al. |
| 2006/0197324 A1 | 9/2006 | Klinkenberger |
| 2006/0232050 A1 | 10/2006 | Kumagai et al. |
| 2006/0284400 A1 | 12/2006 | Sakakibara et al. |
| 2006/0290111 A1 | 12/2006 | Kokeguchi |
| 2007/0126217 A1 | 6/2007 | Nayef |
| 2007/0170710 A1 | 7/2007 | Bouquier |
| 2007/0210565 A1 | 9/2007 | Song et al. |
| 2008/0048420 A1 | 2/2008 | Washino |
| 2008/0054602 A1 | 3/2008 | Yang |
| 2008/0073893 A1 | 3/2008 | Schneider |
| 2008/0100041 A1 | 5/2008 | Kim et al. |
| 2008/0143086 A1 | 6/2008 | Higuchi |
| 2008/0179867 A1 | 7/2008 | Riedel et al. |
| 2008/0308338 A1 | 12/2008 | Kitte et al. |
| 2009/0020987 A1 | 1/2009 | Wipasuramonton |
| 2009/0026743 A1 | 1/2009 | Arez |
| 2009/0121462 A1 | 5/2009 | Rick |
| 2009/0189374 A1 | 7/2009 | Fukawatase |
| 2010/0066064 A1 | 3/2010 | Kotikovsky |
| 2010/0252350 A1 | 10/2010 | Hayashi et al. |
| 2011/0101660 A1 | 5/2011 | Schneider et al. |
| 2011/0140398 A1 | 6/2011 | Song et al. |
| 2012/0025497 A1 | 2/2012 | Yoo |
| 2012/0200069 A1 | 8/2012 | Kato et al. |
| 2012/0223550 A1 | 9/2012 | Mazanek |
| 2012/0299277 A1 | 11/2012 | Fischer et al. |
| 2013/0001935 A1 | 1/2013 | Nagasawa et al. |
| 2013/0087995 A1 | 4/2013 | Lee et al. |
| 2013/0334801 A1 | 12/2013 | Williams |
| 2014/0151985 A1 | 6/2014 | Hotta et al. |
| 2014/0203541 A1 * | 7/2014 | Wei .................. B60R 21/213 280/730.2 |
| 2014/0265271 A1 | 9/2014 | Dinsdale et al. |
| 2014/0375032 A1 | 12/2014 | Fukawatase et al. |
| 2015/0035263 A1 | 2/2015 | Guerrero et al. |
| 2015/0042080 A1 | 2/2015 | Guerrero et al. |
| 2015/0069741 A1 | 3/2015 | Shimazu |
| 2015/0158452 A1 | 6/2015 | Choi et al. |
| 2015/0166002 A1 | 6/2015 | Fukawatase et al. |
| 2015/0175116 A1 | 6/2015 | Cho et al. |
| 2015/0217716 A1 | 8/2015 | Anderson |
| 2015/0258959 A1 * | 9/2015 | Belwafa ............... B60R 21/233 280/729 |
| 2015/0266447 A1 | 9/2015 | Hiruta et al. |
| 2015/0298643 A1 | 10/2015 | Schneider et al. |
| 2016/0009242 A1 * | 1/2016 | Fukawatase ........ B60R 21/2338 280/730.1 |
| 2016/0039385 A1 | 2/2016 | Watamori et al. |
| 2016/0046257 A1 | 2/2016 | Yamada et al. |
| 2016/0075303 A1 | 3/2016 | Iida et al. |
| 2016/0101757 A1 | 4/2016 | Fujiwara |
| 2017/0101071 A1 * | 4/2017 | Kruse ................. B60R 21/0136 |
| 2017/0129439 A1 * | 5/2017 | Taguchi ............... B60R 21/205 |
| 2017/0129444 A1 * | 5/2017 | Fukawatase .......... B60R 21/233 |
| 2017/0217397 A1 * | 8/2017 | Sumiya ................ B60R 21/233 |
| 2017/0282840 A1 * | 10/2017 | Pendse ................. B60R 21/233 |
| 2017/0355346 A1 * | 12/2017 | Kobayashi .......... B60R 21/0136 |
| 2018/0050654 A1 * | 2/2018 | Spahn .................. B60R 21/205 |
| 2018/0056920 A1 * | 3/2018 | Paxton ................. B60R 21/233 |
| 2018/0065587 A1 * | 3/2018 | Maenishi ............. B60R 21/231 |
| 2018/0111581 A1 * | 4/2018 | Wang ................... B60R 21/231 |
| 2018/0111583 A1 * | 4/2018 | Jaradi ................ B60R 21/2338 |

FOREIGN PATENT DOCUMENTS

| | | | |
|---|---|---|---|
| DE | 102012019581 A1 | 4/2012 | |
| EP | 2617607 A1 | 7/2013 | |
| JP | 06024283 | 2/1994 | |
| JP | 2017019485 A * | 1/2017 | ........... B60R 21/239 |
| WO | 2015156088 | 10/2015 | |

OTHER PUBLICATIONS

Office Action dated Dec. 5, 2014, in U.S. Appl. No. 14/099,928, filed Dec. 7, 2013.
Office Action dated Jan. 9, 2015, in U.S. Appl. No. 14/294,405, filed Jun. 3, 2014.
Restriction Requirement dated May 12, 2015, in U.S. Appl. No. 14/512,025, filed Oct. 10, 2014.
Office Action dated May 21, 2015, in U.S. Appl. No. 14/099,928, filed Dec. 7, 2013.
Office Action dated Jun. 25, 2015, in U.S. Appl. No. 14/294,405, filed Jun. 3, 2014.
International Search Report and Written Opinion for PCT/US2015/019716 dated Jun. 3, 2015.
Office Action dated Aug. 4, 2015, in U.S. Appl. No. 14/512,025, filed Oct. 10, 2014.
Office Action dated Sep. 4, 2015, in U.S. Appl. No. 14/258,853, filed Apr. 22, 2014.
International Search Report and Written Opinion for PCT/US2015/029615 dated Sep. 23, 2015.
Office Action dated Dec. 10, 2015, in U.S. Appl. No. 14/099,928, filed Dec. 7, 2013.
Office Action dated Jun. 27, 2016, in U.S. Appl. No. 14/799,302, filed Jul. 14, 2015.

(56) References Cited

OTHER PUBLICATIONS

Office Action dated Apr. 21, 2016, in U.S. Appl. No. 14/258,853, filed Apr. 22, 2014.

* cited by examiner

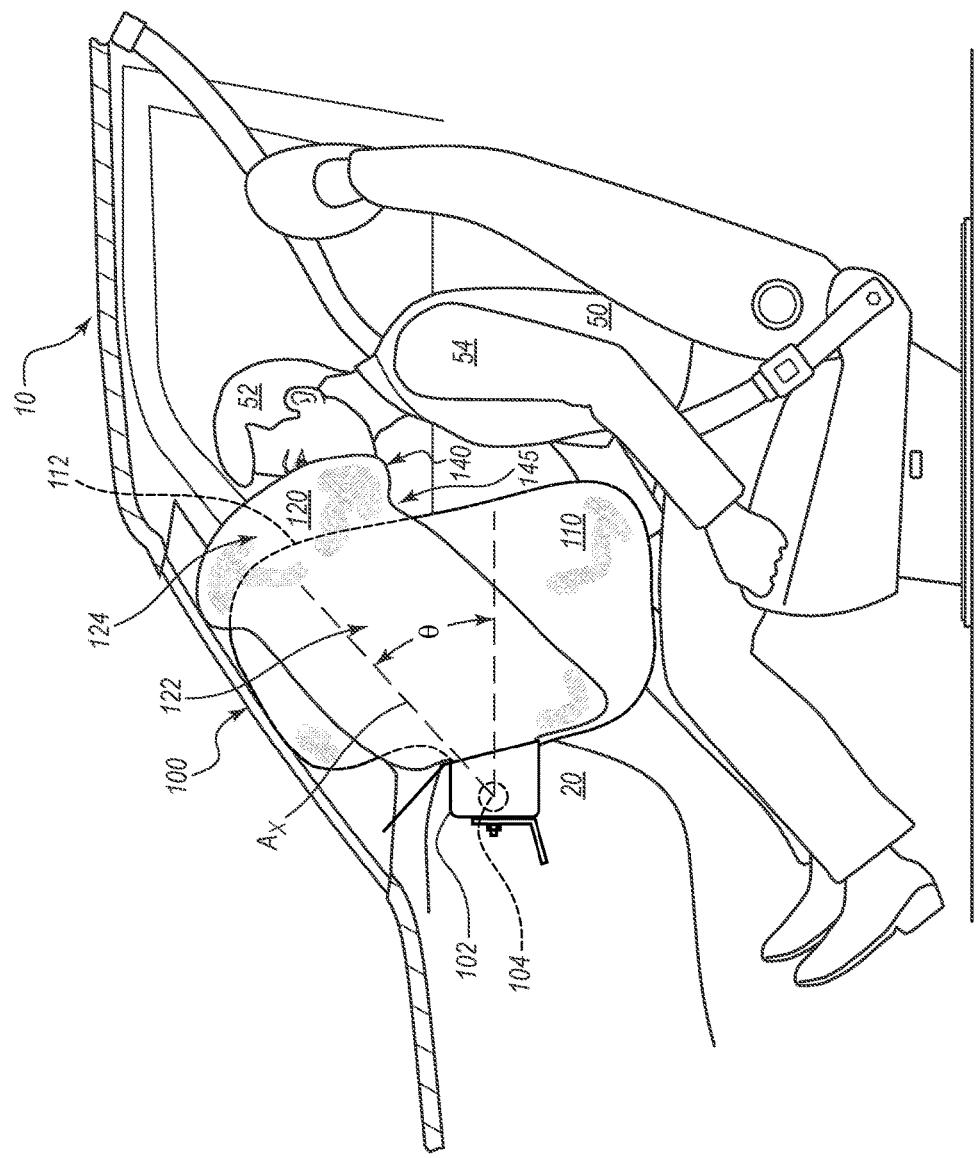

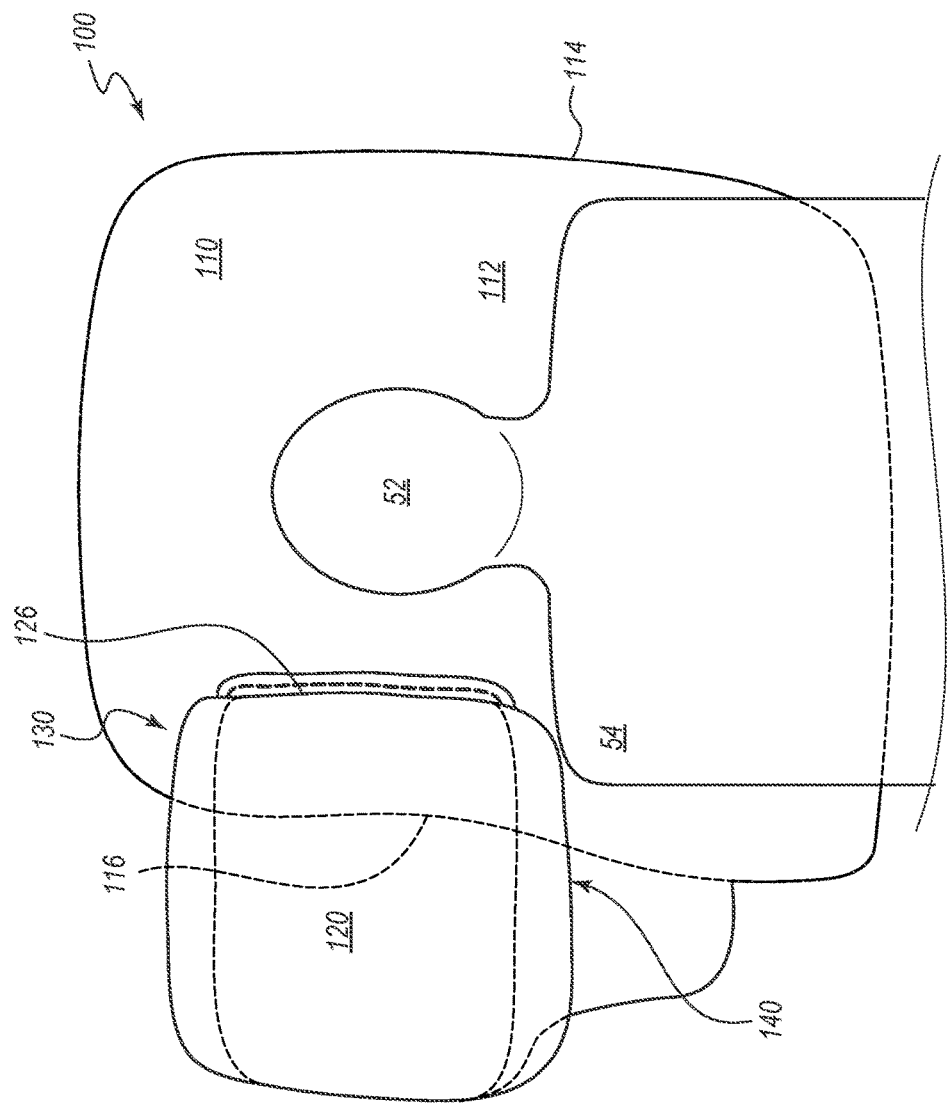

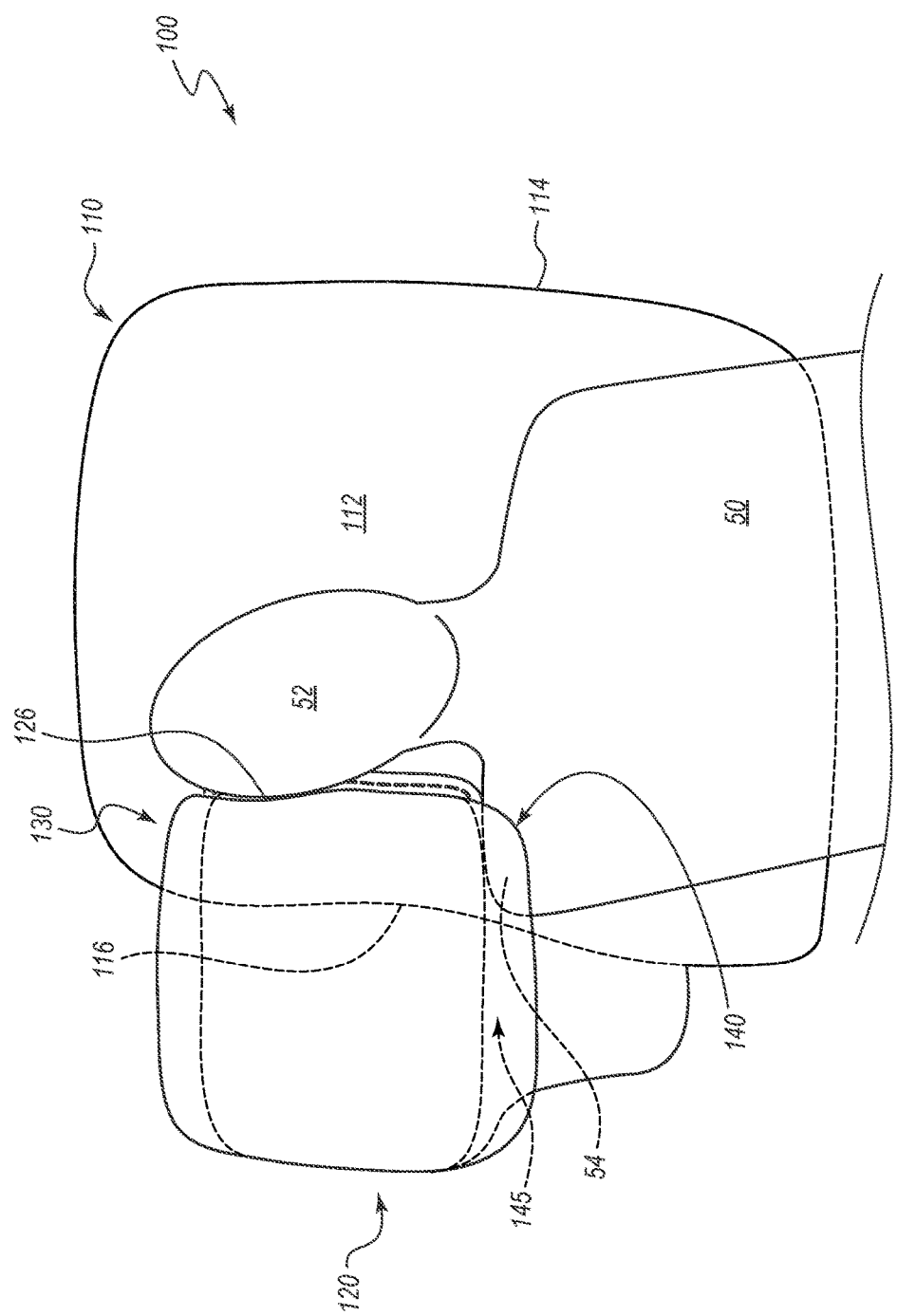

US 10,293,777 B2

MULTI-CUSHION AIRBAG ASSEMBLIES FOR REDUCING ROTATIONAL VELOCITY OF AN OCCUPANT'S HEAD

BACKGROUND

Inflatable airbags may be mounted within a vehicle and deployed during a collision event. A deployed airbag may cushion an occupant and prevent detrimental impact with other vehicular structures. Some airbags suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 1B is a side view of the airbag assembly of FIG. 1A in a deployed state prior to impact by the occupant.

FIG. 1D is a rear view of the airbag assembly of FIGS. 1A-1C in a deployed state prior to impact by the occupant.

FIG. 1G is a rear view of the airbag assembly of FIGS. 1A-1F in a deployed state upon impact by the occupant.

DETAILED DESCRIPTION

Figure 1A:
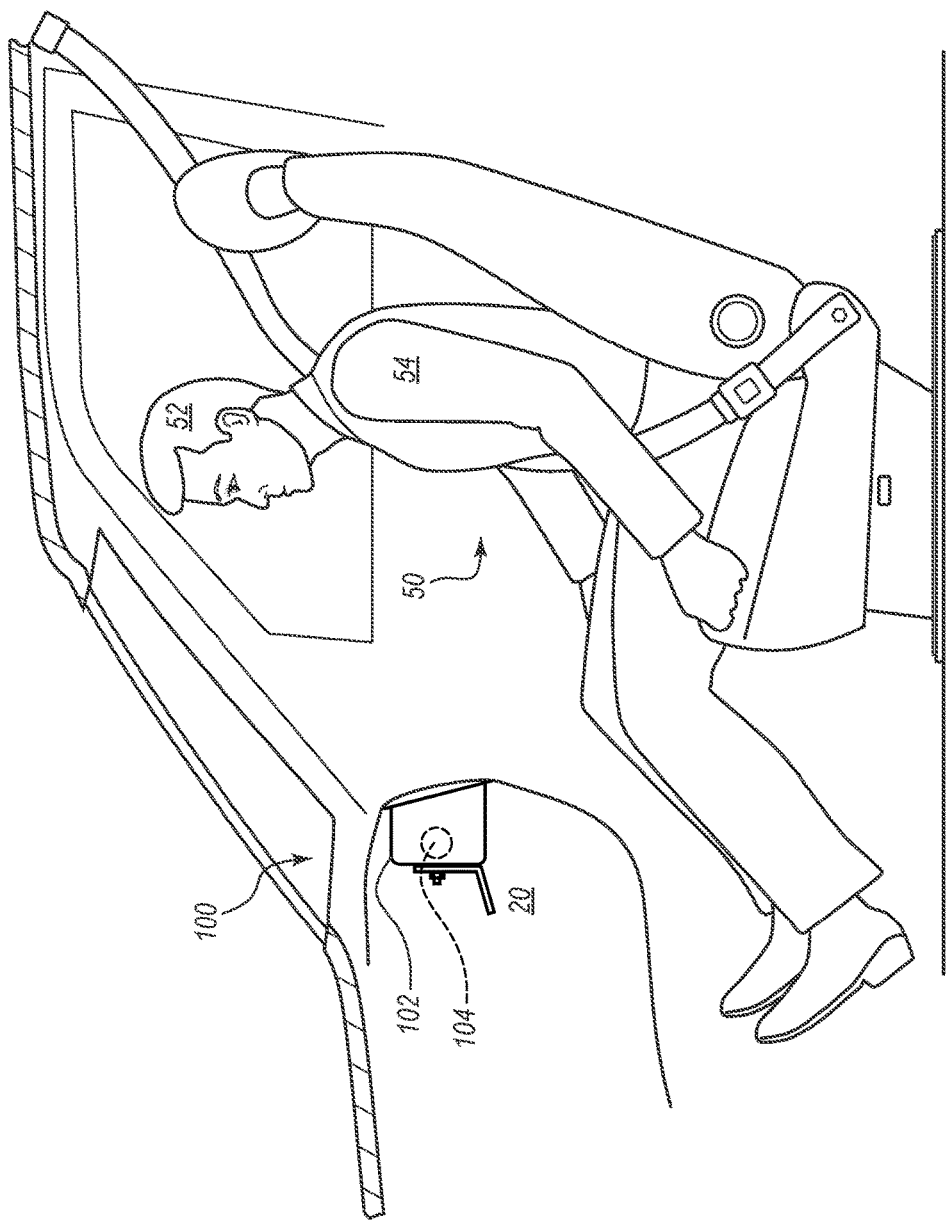
FIG. 1A is a side view of an airbag assembly prior to deployment.

The components of the embodiments as generally described and illustrated in the figures herein can be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The phrase "attached to" refers to interaction between two or more entities which are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas) can flow from one element to another element when the elements are in fluid communication with each other. The phrase "vehicle occupant position" refers to the position in which an occupant is generally positioned when seated in a seat of a vehicle. The term "occupant" refers to a person or crash test dummy within a vehicle. As used herein, the terms "forward" and "rearward" are used with reference to the front and back of the relevant vehicle. For example, an airbag cushion that deploys in a rearward direction deploys toward the back of a vehicle. Furthermore, other reference terms, such as horizontal, are used relative to a vehicle in which an airbag assembly is installed, unless it is clear from context that a different reference frame is intended. Thus, a term such as "horizontal" is used relative to the vehicle, whether or not the vehicle itself is oriented horizontally (e.g., is positioned on level ground) or angled relative to true horizontal (e.g., is positioned on a hill). Unless otherwise stated, all ranges include both endpoints and all numbers between the endpoints.

Inflatable airbag systems are widely used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position. In the following disclosure, "airbag" generally refers to an inflatable front airbag, such as, for example, a passenger airbag that is typically housed within an instrument panel, although the principles discussed may apply to other types of airbags (e.g., driver airbags, knee airbags, and side airbags).

Front airbags are often installed in a dashboard or instrument panel of a vehicle. As used herein, the terms "dashboard" and "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present. During installation, the airbags are typically at an interior of a housing in a packaged state (e.g., are rolled, folded, and/or otherwise compressed) and may be retained in the packaged state behind a cover. During a collision event, an inflator is triggered, which rapidly fills the airbag with inflation gas. The airbag can rapidly transition from the packaged state to an expanded or deployed state. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors.

Certain embodiments of airbag assemblies that are disclosed herein are particularly well suited for cushioning a front-seat passenger, and may be mounted in a dashboard. In some embodiments, an airbag assembly includes multiple inflatable airbag cushions that are configured to receive or otherwise cushion an occupant during a collision event. A first or primary airbag cushion can be configured to deploy primarily toward a vehicle occupant position (i.e., the position typically occupied by a passenger). This primary airbag cushion may be configured to receive the torso and/or the head of a passenger in a frontal collision event. In some embodiments, the first airbag cushion is disposed directly forward of a vehicle occupant position. A second or supplemental cushion may be configured to deploy to a position that is primarily lateral to (e.g., inboard of) the first airbag cushion. For example, in some embodiments, the second cushion deploys from the first airbag cushion in a direction that is lateral, transverse, or perpendicular to the direction in which the first airbag cushion is deployed such that the majority of the second cushion is generally lateral to the first airbag cushion. In other embodiments, the second cushion does not deploy from the first airbag cushion, but rather receives inflation gas from a separate source (or from the same source, but through a separate, dedicated channel) to deploy in a rearward direction from the instrument panel and/or housing to a position that is primarily lateral to the first airbag cushion. The second cushion may be particularly suited for cushioning the head of a vehicle occupant when the occupant moves in an oblique direction relative to a direction of travel of the vehicle.

Airbag assemblies that have multiple cushions may provide increased protection to a passenger, as compared with certain airbags that have only a single inflatable chamber. In some embodiments, the first (e.g., primary) cushion may, when deployed, be disposed directly forward of a vehicle occupant position. The second (e.g., supplemental) cushion may be configured to receive and/or stabilize a head of the passenger when the vehicle is involved in a collision that causes the vehicle occupant to move in both a forward direction and an inboard direction (e.g., oblique to the direction of travel). The second cushion may also stabilize the first airbag cushion relative to the instrument panel.

In some instances a single-chamber airbag may be too narrow and/or improperly positioned or shaped to provide effective coverage for a vehicle occupant who has a forward and inboard trajectory (which may also be referred to as an angled or oblique trajectory). In some instances, a vehicle occupant may slide off of the single-chamber airbag cushion during loading of the airbag when the occupant has a forward and inboard trajectory, or the occupant may entirely fail to engage with the cushion.

An occupant's inboard (e.g., lateral) trajectory may arise from frontal-impact collisions where the impact is not distributed uniformly across the front plane of the vehicle. Such collisions may be, for example, oblique vehicle-to-vehicle collisions, such as collisions in which, immediately prior to impact, the occupant's vehicle is traveling in a direction that is not substantially parallel to the other vehicle's direction of travel; co-linear vehicle-to-vehicle collisions, such as collisions where, immediately prior to impact, both vehicles are traveling in substantially parallel directions; or collisions with a stationary object. These collisions can result in oblique movement of the occupant, which may allow the occupant's head to slide across or fall off of the primary cushion.

As the occupant moves in an oblique direction, the head of the occupant may twist or rotate with significant rotational (i.e., angular) velocity, which can lead to traumatic brain injury. For example, as a front-seat passenger travels in a forward and inboard direction during an oblique collision event, the occupant's head may engage with the first airbag cushion and rotate about a vertical axis (a "z"-axis) with substantial force. For instance, during an oblique collision event in which a passenger on the right-hand side of the vehicle travels in a forward and inboard direction, the passenger's head may engage with the first airbag cushion, causing the passenger's head to turn forcefully to the right (e.g., rotate clockwise, as viewed from above). The risk of traumatic head/brain injury from rapid rotation of the occupant's head can be reduced by employing airbag systems that reduce the rotational velocity of the occupant's head during a collision event. For example, as described in detail herein, a second (e.g., supplementary) cushion can be used to reduce the rotational velocity of the head during a collision event. In addition to reducing rotational velocity of the occupant's head, the second cushion may also provide an additional contact surface for cushioning the head of the occupant during a collision event. Embodiments disclosed herein may provide increased cushioning and/or protection from rotational motion of the head, leading to improved head injury criterion (HIC) and/or brain injury criterion (BrIC) scores for an occupant involved in a collision event.

Some embodiments disclosed herein can provide improved positioning, cushioning, and/or safety to occupants involved in particular types of collisions. For example, some embodiments can be particularly suited to cushion front-seat passengers seated adjacent the passenger-side door. Examples of types of collisions in which certain embodiments may prove advantageous include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the vehicle width, (5) collisions as specified for the Insurance Institute for Highway Safety (IIHS) small overlap frontal crash test, or (6) collisions as specified for the National Highway Traffic Safety Administration (NHTSA) left oblique impact test. The conditions for the IIHS small overlap front crash test and the NHTSA oblique impact test are disclosed in the Insurance Institute for Highway Safety, *Small Overlap Frontal Crashworthiness Evaluation Crash Test Protocol (Version III)* (May 2014) and Saunders, J., Craig, M., and Parent, D., *Moving Deformable Barrier Test Procedure for Evaluating Small Overlap/Oblique Crashes*, SAE Int. J. Commer. Veh. 5(1):172-195 (2012), the entire contents of each of which are hereby incorporated by reference herein. These documents pertain to oblique collision events.

In some embodiments, the first airbag cushion may deploy or begin deployment before the second cushion begins to be deployed. The second cushion can be configured to receive gas via one or more vents that enable fluid communication between the first airbag cushion and the second cushion. In some embodiments, the vent(s) allow for the free flow of air in both directions. In other embodiments, the vent(s) may be one-directional (e.g., allowing air flow from the first (e.g., primary) airbag cushion to the second airbag cushion, but not from the second airbag cushion to the first airbag cushion). In still other embodiments, the vents may be adaptively closeable to restrict airflow from the second airbag cushion to the first airbag cushion upon equalization of pressure in the second airbag cushion with pressure in the first airbag cushion. Advantages of various embodiments will be evident from the present disclosure.

Figure 1C:
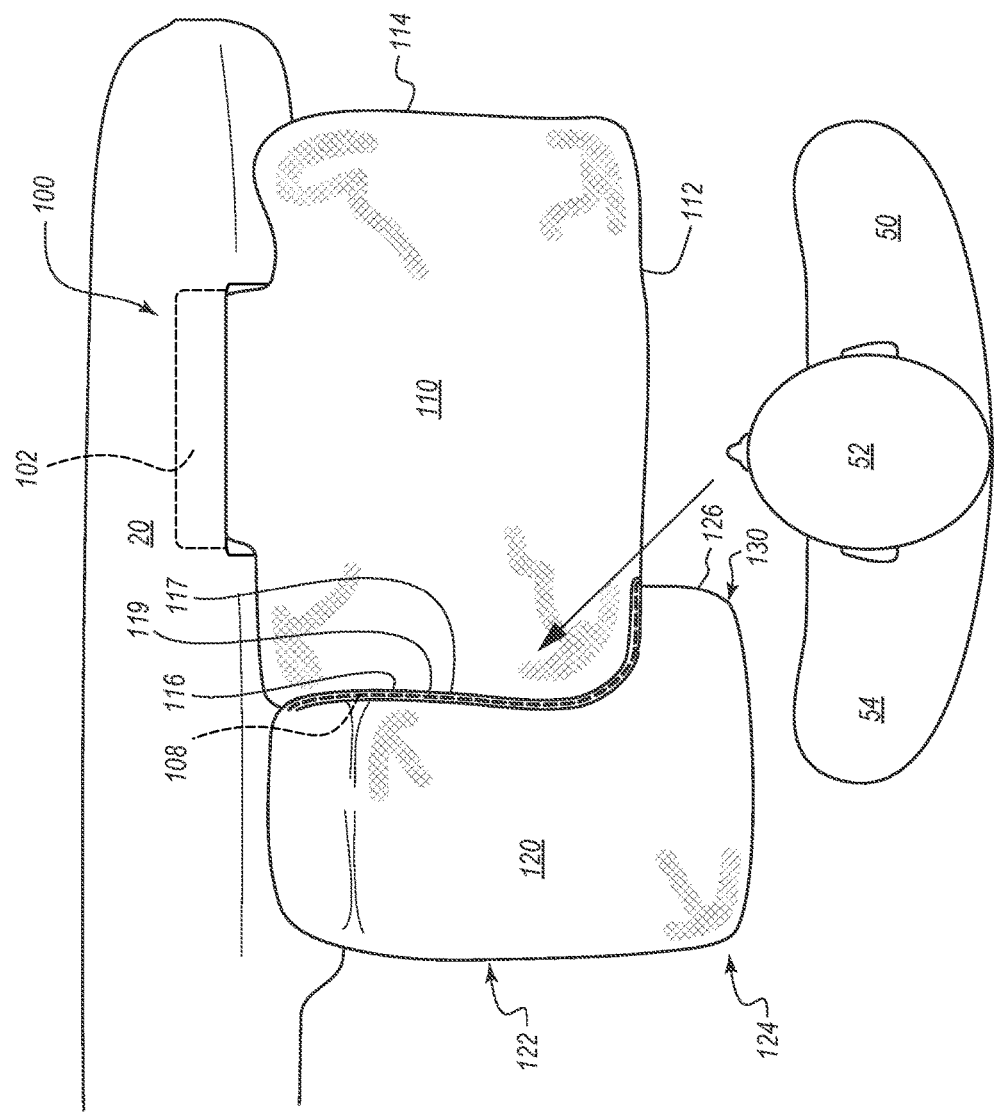
FIG. 1C is a top view of the airbag assembly of FIGS. 1A-1B in a deployed state prior to impact by the occupant.
Figure 1E:
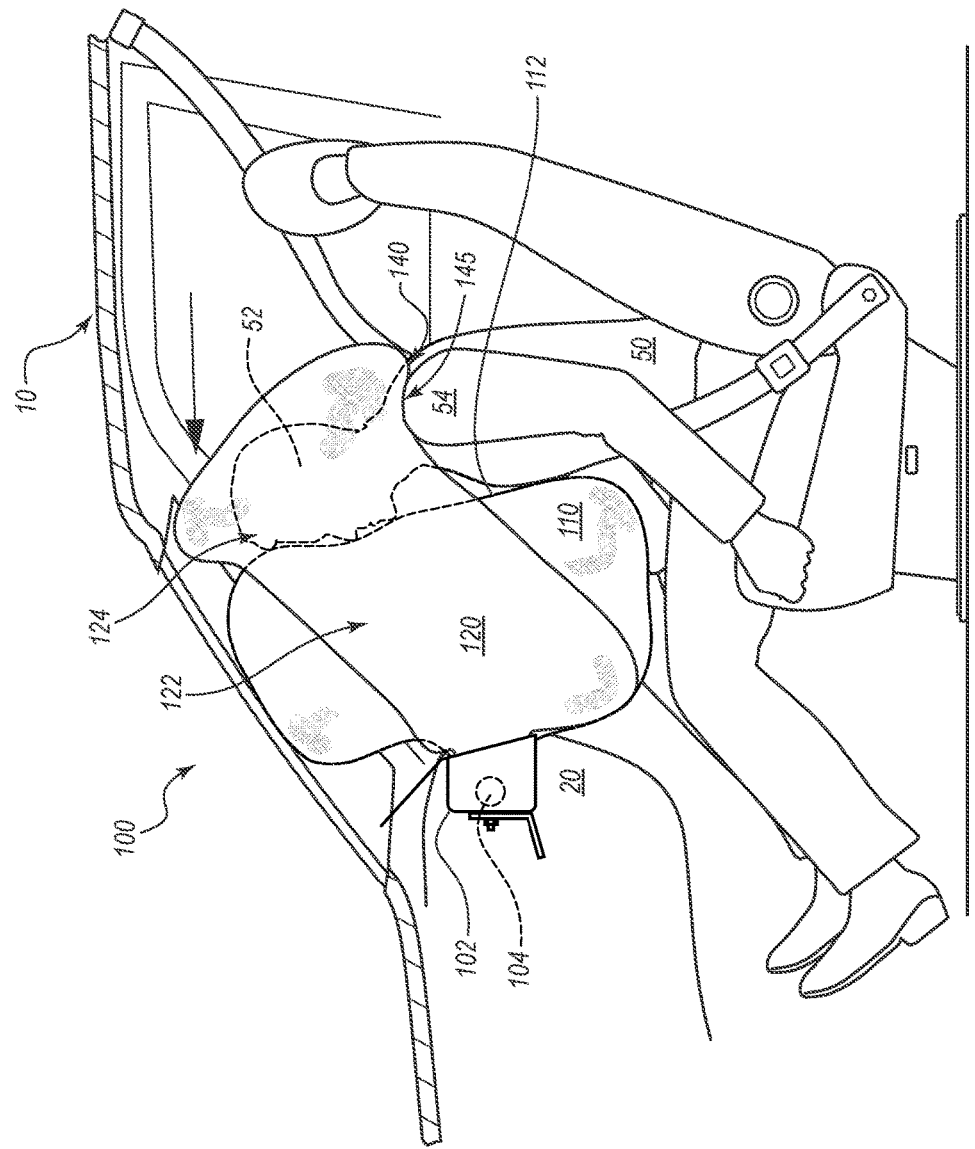
FIG. 1E is a side view of the airbag assembly of FIGS. 1A-1D in a deployed state upon impact by the occupant.
Figure 1F:
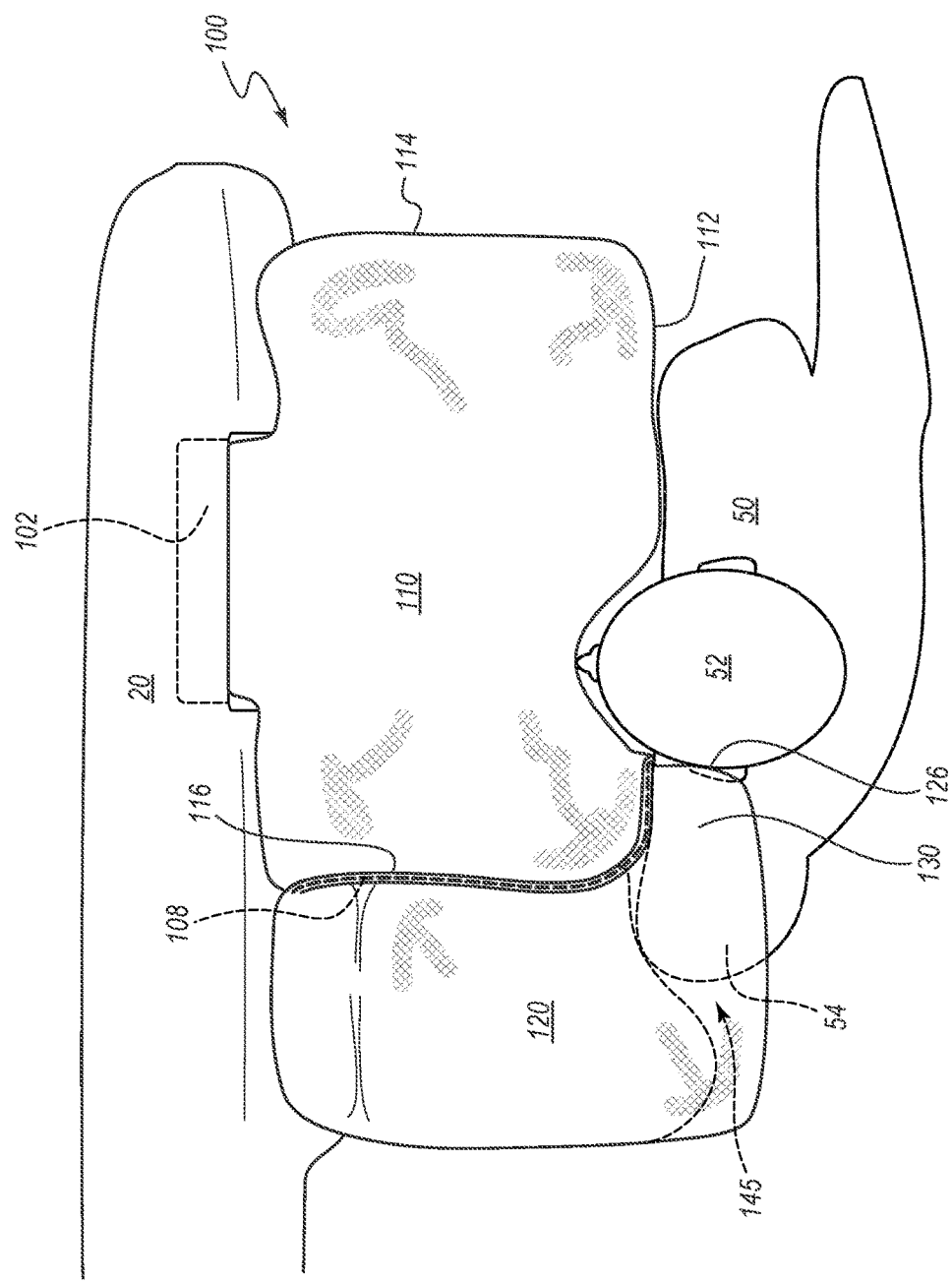
FIG. 1F is a top view of the airbag assembly of FIGS. 1A-1E in a deployed state upon impact by the occupant.
Figure 1H:
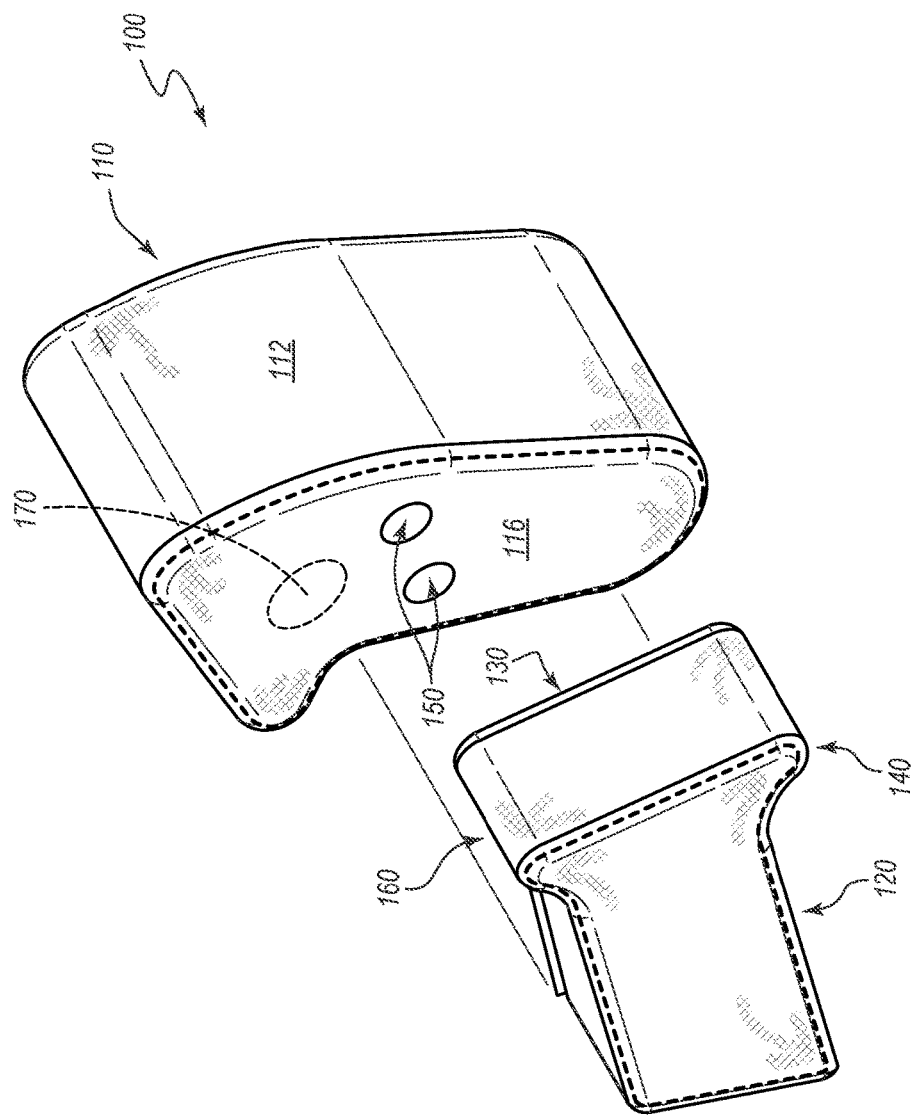
FIG. 1H is an exploded perspective view of the airbag assembly of FIGS. 1A-1G.
Figure 1J:
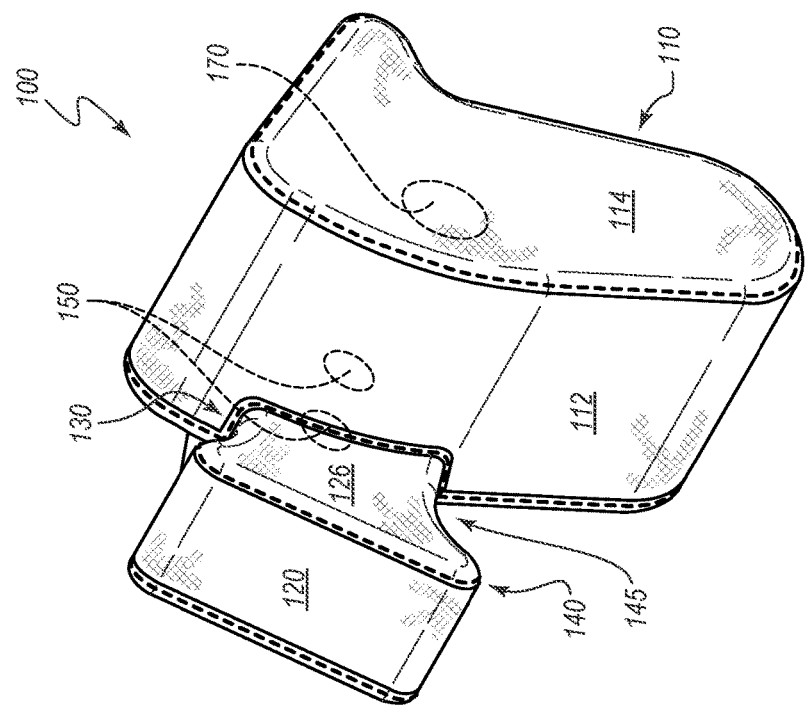
FIG. 1J is another perspective view of the airbag assembly of FIGS. 1A-1I.
Figure 1I:
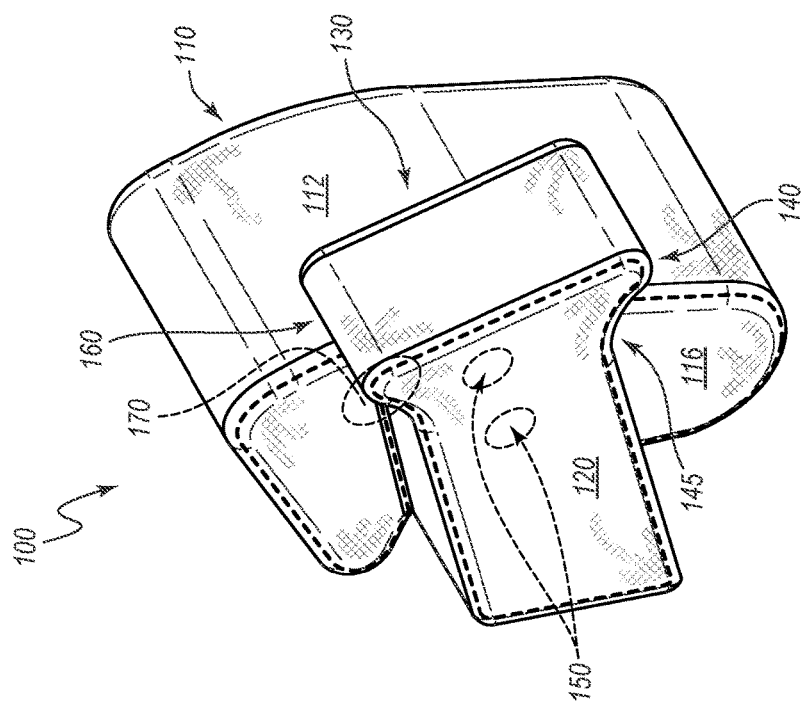
FIG. 1I is a perspective view of the airbag assembly of FIGS. 1A-1H.

FIGS. 1A-1J depict various views of an airbag assembly 100. More particularly, FIG. 1A depicts a side view of the airbag assembly 100 in a vehicle 10 prior to deployment. FIGS. 1B-1D depict side (FIG. 1B), top (FIG. 1C), and rear (FIG. 1D) views of the airbag assembly 100 in a deployed state prior to impact by the occupant 50. FIGS. 1E-1G depict side (FIG. 1E), top (FIG. 1F), and rear (FIG. 1G) views of the airbag assembly 100 in a deployed state upon occupant 50 impact. FIGS. 1H-1J depict various perspective view of the airbag assembly 100 in exploded (FIG. 1H) and non-exploded (FIGS. 1I and 1J) states.

As shown in FIGS. 1A-1J, the airbag assembly 100 may include, among other elements, a housing 102, an inflator 104, a first airbag cushion 110, and second airbag cushion 120.

The housing 102 may be of any suitable variety, and may include or otherwise be coupled with a cover (not shown), behind which one or more airbag cushions 110, 120 may be located. The cover may be of any suitable variety, and may include a tear seam or burst seam through which the airbag cushion(s) 110, 120 may deploy. The housing 102 may be mounted within and fixed to, or be in a fixed position relative to, an instrument panel 20 of the vehicle 10 in any suitable manner.

The inflator 104 may be configured to release inflation gas to inflate one or both of the first airbag cushion 110 and the second airbag cushion 120. For example, the inflator 104 may be configured to deliver inflation gas through a throat 170 (FIGS. 1H, 1J) of the first airbag cushion 110.

The first airbag cushion 110 and the second airbag cushion 120 may be manufactured in any suitable manner, such as via one-piece weaving, "cut-and-sew" techniques, or a combination of these and/or other methods. In some embodiments, one or more of the first and second airbag cushions 110, 120 can be formed of separate panels that are joined together by sealed or unsealed seams, with the seams formed by any of a variety of suitable techniques. For example, the seams may be formed by stitching, adhesive, taping, radio frequency welding, heat bonding, and/or any other suitable technique or combination of techniques.

The first airbag cushion 110 may be of any suitable shape. In some embodiments, the first airbag cushion 110 is formed from a suitable arrangement of panels that are attached to one another (e.g., via stitching, adhesives, or other suitable bonding mechanisms). In other embodiments, the first airbag cushion 110 may be formed from a single unitary piece of material. The first airbag cushion 110 may include a first lateral face 114 that faces outboard toward the side door of the vehicle 10 and a second lateral face 116 that faces inboard toward the interior of the vehicle 10. One or more additional faces may connect with the lateral faces 114, 116 to substantially enclose and/or define the first airbag cushion 110. In some embodiments, the first airbag cushion 110 resembles a traditional single-chamber passenger airbag in size and shape. The first inflatable airbag cushion 110 may be configured to receive a front side of a head 52 of an occupant 50 during a collision event, such as a collision event in which the occupant 50 moves in a forward and lateral direction. When inflated, the first inflatable airbag cushion 110 may be disposed directly forward of a vehicle occupant position.

The second cushion 120 may be of any suitable shape. The second cushion 120, like the first airbag cushion 110, may be formed from a plurality of separate panels that are joined along their edges. Alternatively, the second cushion 120 may be formed from a single unitary piece of material. In some embodiments, the total inflated volume of the second cushion 120 is less than the total inflated volume of the first airbag cushion 110.

In some embodiments, the second cushion 120 is in fluid communication with the first airbag cushion 110 via one or more vents 150 (FIGS. 1H-1J) disposed in a sidewall (e.g., lateral face 116) that separates the first airbag cushion 110 from the second cushion 120. In some embodiments, the one or more vents 150 allow for the free flow of air in both directions. In other embodiments, the vent(s) may be one-directional (e.g., allowing air flow from the first (e.g., primary) airbag cushion 110 to the second airbag cushion 120, but not from the second airbag cushion 120 to the first airbag cushion 110). In still other embodiments, the vent(s) 150 may be adaptively closeable to restrict airflow from the second airbag cushion 120 to the first airbag cushion 110 upon equalization of pressure in the second airbag cushion 120 with pressure in the first airbag cushion 110. In some embodiments, the first airbag cushion 110 and the second airbag cushion 120 are not in fluid communication with one another through a vent.

The second cushion 120 may be joined to the first airbag cushion 110 in any suitable manner, such as via stitching, adhesive, radio frequency welding, or heat bonding. In some embodiments, one or more seams 108 join a side panel (e.g., the lateral face 116) of the first airbag cushion 110 to the second cushion 120. For example, in the illustrated embodiment, the second cushion 120 is secured to a side panel 117 of the first airbag cushion 110 via stitching 119 (FIG. 1C). In some embodiments, the first airbag cushion 110 and the second cushion 120 share a panel (such as the panel 117) that separates the chamber of the first airbag cushion 110 from the chamber of the second cushion 120. In some embodiments, the first airbag cushion 110 and the second cushion 120 may be individually or collectively formed from a single unitary piece of material.

The second inflatable airbag cushion 120, when inflated, may be disposed primarily lateral to (e.g., inboard of) the first inflatable airbag cushion 110. When inflated, the second inflatable airbag cushion 120 may also extend further rearward than the first inflatable airbag cushion 110. Stated differently, the second inflatable airbag cushion 120 may include a forward portion 122 that is disposed lateral of the first airbag cushion 110 and a rearward portion 124 that at least partially extends rearward of a rearward surface 112 of the first inflatable airbag cushion 110.

When deployed, the second inflatable airbag cushion 120 (or a longitudinal axis thereof) may extend upward and rearward from the housing 102 and/or the instrument panel 20 at an angle $\theta$ that is between 30 degrees and 80 degrees, between 40 degrees and 70 degrees, between 45 degrees and 65 degrees, and/or between 50 degrees and 60 degrees from horizontal. Accordingly, in certain embodiments, the angle $\theta$ may be significantly greater than the angle shown in FIG. 1B. The second airbag cushion 120 may be angled upward by an amount greater than the first airbag cushion 110. The angle $\theta$ configures the geometry the rearward portion 124, which interfaces with the occupant's head, such that the rearward portion 124 counteracts rotational velocity of the head. Stated otherwise, changing the angle $\theta$ changes the shape of an interfacing surface (e.g., an outboard surface 126) where an occupant impacts the rearward portion 124, which can assist in minimizing rotational velocity of the head. The effectiveness of a given angle $\theta$, may depend on the direction at which the head is impacting the rearward lobe. Different vehicles and/or crash scenarios may impel the head differently.

The rearward portion 124 of the second inflatable airbag cushion 120 may include a lateral protrusion 130 that covers at least a portion of a rearward surface 112 of the first inflatable airbag cushion 110. Stated differently, the lateral protrusion 130 may be disposed directly rearward of a rearward surface 112 of the first inflatable airbag cushion 110. In some embodiments, the first airbag cushion 110 has a width (e.g., a maximum distance in the horizontal direction in the views shown in FIGS. 1C and 1F) and the lateral protrusion 130 extends across 10 percent to 35 percent of the width of the first airbag cushion 110. In some embodiments, the lateral protrusion 130 is an outboard lobe of the airbag cushion 120 that is disposed rearward of the first inflatable airbag cushion 110.

In some embodiments, the lateral protrusion 130, or outboard lobe, is attached to the first airbag cushion 110. For example, in some embodiments, the lateral protrusion 130 is attached to a rearward surface of the first airbag via stitching and/or welding. Attachment of the lateral protrusion 130 to the first airbag cushion 110 may prevent the lateral protrusion 130 from separating from the first airbag cushion 110 as the occupant 50 strikes the first airbag cushion 110 and/or the second airbag cushion 120.

In some embodiments, the rearward portion 124 of the second inflatable cushion 120 may further include a downward protrusion 140. In some embodiments, the downward protrusion 140 is a lobe that extends generally downwardly when the cushion 120 is fully deployed and is disposed rearward of the first inflatable airbag cushion 110. In some embodiments, the second inflatable chamber further includes an upward protrusion 160. In some embodiments, the second inflatable cushion does not include a downward protrusion or an upward protrusion.

The second inflatable airbag cushion 120 may be configured to reduce the rotational velocity of an occupant 50 (e.g., a front-seat passenger) and/or the occupant's head 52 during a collision event, such as a collision event in which the front-seat passenger moves in a forward and inboard direction. In some embodiments, the rotational velocity of the occupant's head 52 may be reduced by 5-100%, by 25-90%, and/or by 50-80% due to interaction with the second inflatable airbag cushion 120. For example, in some instances, the maximum rotational velocity of an occupant's head 52 during a collision event may be reduced by 5-100%, by 25-90%, and/or by 50-80%. The second inflatable airbag cushion 120 may, in some instances, cause deceleration (or decrease the extent of acceleration) of an occupant's head 52. Such measurements may be obtained via an accelerometer, such as an accelerometer mounted in a dummy's head.

In some embodiments, the second airbag cushion 120 may be sized, shaped, and positioned such that, when deployed during an oblique collision event, an outboard surface 126 of the second airbag cushion 120 contacts a side (e.g., an inboard side) of the occupant's head 52. Likewise, the second airbag cushion 120 may limit the total rotation of the occupant's head to a smaller rotational angle, as compared with systems that lack a second airbag cushion 120. The rotational angle may be measured, for example, about an axis that passes vertically through the neck of the occupant. Stated otherwise, the second airbag cushion 120 may inhibit rotation of the occupant's head 52. The second airbag cushion 120 may additionally or alternatively reduce the rotational velocity of the occupant's head 52 about the same axis. Any reduction of rotational velocity is an improvement, and a typical range of reduction achieved by the disclosed embodiments may be in a range of 50%-80%.

In some embodiments, the outboard side 126 of the second airbag cushion 120 may be substantially planar and vertically oriented. Other shapes and configurations for the outboard side 126 of the second airbag cushion 120, including, for example, the shapes and configurations shown in FIGS. 4-8B and discussed below, are also within the scope of this disclosure.

As shown in FIG. 1A, prior to deployment, the first airbag cushion 110 and the second airbag cushion 120 may be stored in a packaged state within the housing 102. In response to (or in anticipation of) a collision event, an inflator 104 may be triggered, which rapidly fills the airbags 110, 120 with inflation gas. The inflation gas from the inflator 104 may cause the airbag cushions 110, 120 to rapidly transition from a compact packaged state (as shown in FIG. 1A) to a deployed state (as shown in FIGS. 1B-1G). Stated differently, inflation gas from the inflator 104 may be delivered through the throat 170 into the first airbag cushion 110 and can additionally pass through the one or more vents 150 and inflate the second airbag cushion 120. In some embodiments, the first airbag cushion 110 is deployed prior to deployment of the second airbag cushion 120. The inflator 104 may be triggered by any suitable device or system. For example, the inflator 104 may be triggered in response to input from one or more vehicle sensors that detect or anticipate a collision event.

In some collision events, the occupant may move in a forward and lateral direction. For example, FIGS. 1B-1D show initial movement of the occupant 50 in a forward and lateral direction, while FIGS. 1E-1G show contact of the occupant 50 with the airbag assembly 100. In some instances in which the occupant 50 moves in a forward and lateral direction, an inboard shoulder 54 of the occupant 50 may pass below a downward protrusion 140 of the second inflatable airbag cushion 120 (compare FIGS. 1B and 1E). For example, the airbag assembly 100 may be designed such that a shoulder of a fiftieth percentile male crash test dummy passes below the downward protrusion 140 during an oblique collision event.

In some embodiments, the second airbag cushion 120 defines a recess 145 into which the shoulder 54 of the occupant 50 may be received. In the illustrated embodiment, the recess 145 is positioned forward of the downward protrusion 140. In some arrangements, as the occupant 50 moves in a forward and lateral direction due to an oblique collision event, the shoulder 54 moves laterally into the recess 145. The shoulder 54 thus may minimally affect the geometry of the inflated cushion 120. Stated otherwise, the shoulder 54 may not push the second cushion 120 laterally and away from the head of the occupant 50, as might otherwise occur in the absence of the recess 145. The recess 145 thus may assist in permitting early contact of the cushion 120 with the head of the occupant 50. As shown in FIG. 1E, in some arrangements, at least a portion of the downward protrusion 140 may rest on or behind the shoulder 54 of the occupant 50 when the shoulder 54 is positioned within the recess 145. In some instances, such an arrangement may assist in stabilizing the second cushion 120 as the head 52 imparts energy thereto. For example, in some instances, such an arrangement may inhibit rotation of the second cushion 120 about an axis $A_X$ (FIG. 1B).

As the occupant 50 travels in a forward and lateral direction, a front side of the occupant's head 52 may engage with the first airbag cushion 110, and an inboard side of the head 52 of the occupant 50 may engage with an outboard surface 126 of the lateral protrusion 130 of the second airbag cushion 120. The inboard side of the head 52 of the occupant 50 may engage with a second airbag cushion 120 that includes a lateral protrusion 130 earlier than it would engage with a second airbag cushion 120 that lacks the lateral protrusion 130. Early engagement of head 52 of the occupant 50 may reduce rotation of the head 52 and thereby more fully protect the occupant 50 from traumatic brain injury. In some embodiments, the airbag assembly 100 is designed to engage with a head 52 of an occupant 50 within a particular time frame after the actuator has been triggered. For example, in some embodiments, the second airbag cushion 120 is designed to engage with the head 52 of the occupant 50 between approximately (or exactly) 40 milliseconds and 75 milliseconds and/or 50 milliseconds and 65 milliseconds after the actuator has been triggered. Stated otherwise, in some embodiments, the second airbag cushion is configured to fully deploy between approximately (or exactly) 40 milliseconds and 75 milliseconds and/or 50 milliseconds and 65 milliseconds after the actuator has been triggered.

As noted above, the second airbag cushion 120 may include a downward protrusion 140 and/or an upward protrusion 160. The downward protrusion 140 and the upward protrusion 160 may increase the surface area of an outboard surface 126 of the second airbag cushion 110. This increased surface area may provide increased cushioning for and/or decrease the extent of rotation of a head 52 of an occupant 50 during a collision event.

While FIGS. 1A-1J depict an airbag assembly 100 in which inflation gas is delivered from a single inflator 104 into the first airbag cushion 110, through one or more valves 150, and into a second airbag 120 to deploy the first airbag cushion 110 and the second airbag cushion 120 from a single housing 102, other suitable arrangements are also within the scope of this disclosure. For example, in some embodiments, the first airbag cushion 110 and the second airbag cushion 120 receive inflation gas from different inflators. The use of separate inflators for each airbag cushion 110, 120 may allow for more rapid inflation of the airbag cushions 110, 120 and remove the need for a valve between the first airbag cushion 110 and the second airbag cushion 120. Stated differently, in some embodiments, the first airbag cushion 110 and the second airbag cushion 120 are not in fluid communication with each other. In other or further embodiments, a single inflator 104 may deploy each of the first and second airbag cushions 110, 120 separately. For example, the inflator 104 may be in fluid communication with the first airbag cushion 110 via the throat 170, and may be in fluid communication with the second airbag cushion 110 via a separate fluid path that does not pass through any portion of the first airbag cushion 110. The first and second airbag cushions 110, 120 may be deployed simultaneously or one of the first and second airbag cushions 110, 120 may be deployed in part or in total before the other.

Figure 2:
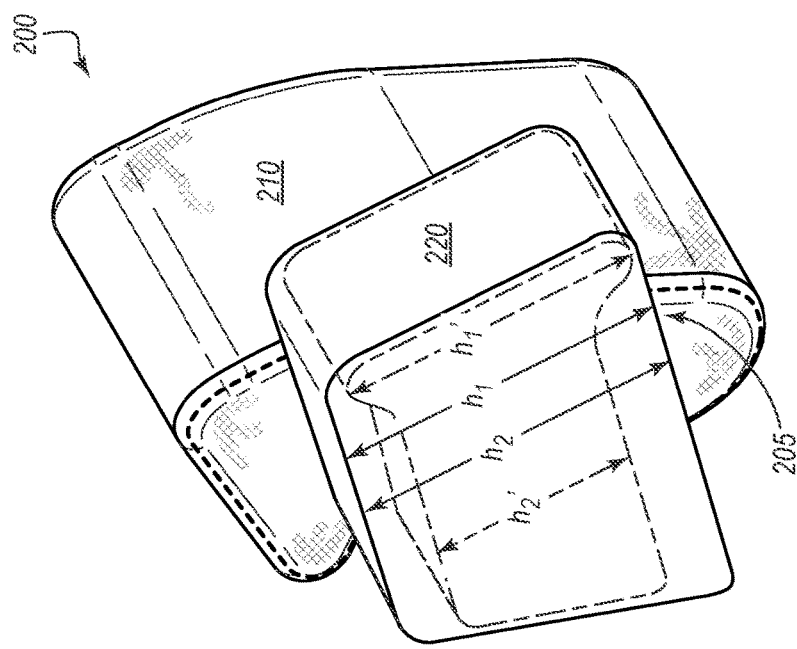
FIG. 2 is a perspective view of an airbag assembly according to another embodiment.

FIG. 2 depicts an embodiment of an airbag assembly 200 that resembles the airbag assembly 100 described above in certain respects. Accordingly, like features are designated with like reference numerals, with the leading digits incremented to "2." For example, the embodiment depicted in FIG. 2 includes a first airbag cushion 210 that may, in some respects, resemble the first airbag cushion 110 of FIGS. 1A-1J. Relevant disclosure set forth above regarding similarly identified features thus may not be repeated hereafter. Moreover, specific features of airbag assemblies and related components shown in FIGS. 1A-1J may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the airbag assembly 200 and related components depicted in FIG. 2. Any suitable combination of the features, and variations of the same, described with respect to the airbag assembly 100 and related components illustrated in FIGS. 1A-1J can be employed with the airbag assembly 200 and related components of FIG. 2, and vice versa. This pattern of disclosure applies equally to further embodiments depicted in subsequent figures and described hereafter, wherein the leading digits may be further incremented.

FIG. 2 depicts a perspective view of an airbag assembly 200 that includes a first airbag cushion 210 and a second airbag cushion 220. In contrast to the second airbag cushion 120 shown in FIGS. 1A-1J, the second airbag cushion 220 lacks a lateral protrusion, a downward protrusion, and an upward protrusion. The second airbag cushion 120 of the airbag assembly 100 of FIGS. 1A-1J is shown in phantom to illustrate the structural differences between the second airbag cushion 220 and the second airbag cushion 120 of FIGS. 1A-1J.

As shown in FIG. 2, the rearward portion of the second airbag 220 lacks both an upward protrusion 160 and a downward protrusion 140. The rearward portion of the second airbag cushion 220 has a height ($h_1$) that is substantially the same as the height ($h_2$) of a rearward portion of the second airbag cushion 220. In contrast, the height ($h_1'$) of the rearward portion 124 of the second airbag cushion 120 of FIGS. 1A-1J is greater than the height ($h_2'$) of a forward portion 122 of the second airbag cushion 120. In FIG. 2, the height ($h_1$) of the rearward portion of the second airbag cushion 220 and the height ($h_1'$) of the rearward portion of second airbag cushion 120 are the same.

During an oblique collision event, the inboard shoulder of the occupant may contact a shoulder engagement site 205 on the second airbag cushion 220. Such contact may displace the second airbag cushion 220, causing the second airbag cushion 220 to be less aptly positioned for receiving an inboard side of the head of the occupant. In other words, relative to the second airbag 120, the second airbag 220 may be more prone to misplacement as a result of contact with a shoulder of the occupant.

As the second airbag cushion 220 also lacks a lateral protrusion, the head 52 of the occupant may engage with the second airbag cushion 220 later during a collision event than it would engage with the second airbag cushion 120 in an otherwise identical collision event. As the second airbag cushion 220 may engage with the occupant's head at a later point in time, the second airbag cushion 220 may reduce the extent of rotation of the occupant's head to lesser extent than does the second airbag cushion 120 of the airbag assembly 100.

Figure 3:
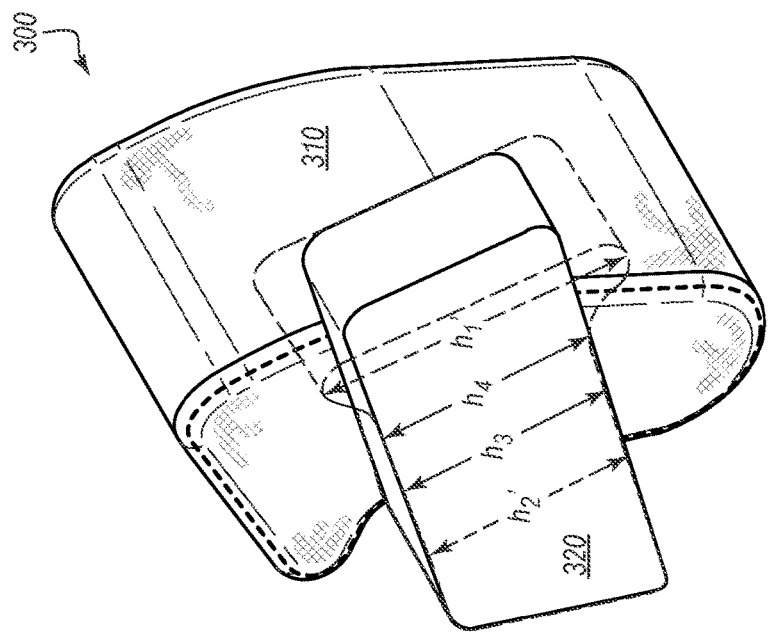
FIG. 3 is a perspective view of an airbag assembly according to another embodiment.

FIG. 3 depicts a perspective view of an airbag assembly 300 that includes a first airbag cushion 310 and a second airbag cushion 320. The second airbag cushion 120 of the airbag assembly 100 of FIGS. 1A-1J is shown in phantom to illustrate the structural differences between the second airbag cushion 320 and the second airbag cushion 120 of airbag assembly 100. Like the airbag cushion 220 shown in FIG. 2, the second airbag cushion 320 lacks a lateral protrusion, a downward protrusion, and an upward protrusion. However, the second airbag cushion 320 is generally smaller than the second airbag cushion 220.

More specifically, the forward portion of the second airbag cushion 320 has a height ($h_3$) that is substantially the same as the height ($h_2'$) of a forward portion 122 (i.e., a relatively narrow portion) of the second airbag cushion 120. In contrast, the height ($h_1'$) of the rearward portion of the second airbag cushion 120 of FIGS. 1A-1J is greater than the height ($h_4$) of a forward portion of the second airbag cushion 220. In FIG. 3, the height ($h_4$) of the rearward portion of the second airbag cushion 320 and the height ($h_3$) of the forward portion of the second airbag cushion 320 are substantially the same.

The surface area of an outboard surface (not shown) of the second airbag cushion 320 may be smaller than the outboard surface 126 of the second airbag 120 due to the additional surface area provided by the upward protrusion 160 and the downward protrusion 140 of the second airbag 120. In other words, the second airbag cushion 120 may provide additional surface area for cushioning and reducing the rotational velocity of a head 52 of an occupant than the second airbag cushion 320.

FIGS. 4-8B depict views of five different airbag assemblies for reducing the rotational velocity of an occupant's head. Each of these airbag assemblies include a first airbag cushion that is configured to receive a front side of an occupant's head during an oblique collision event and a second airbag cushion that is configured to receive an inboard side of an occupant's head during the oblique collision event. Each of the second airbag cushions for each of the five airbag assemblies provide an outboard surface that differs in orientation relative to the other outboard surfaces.

Figure 4:
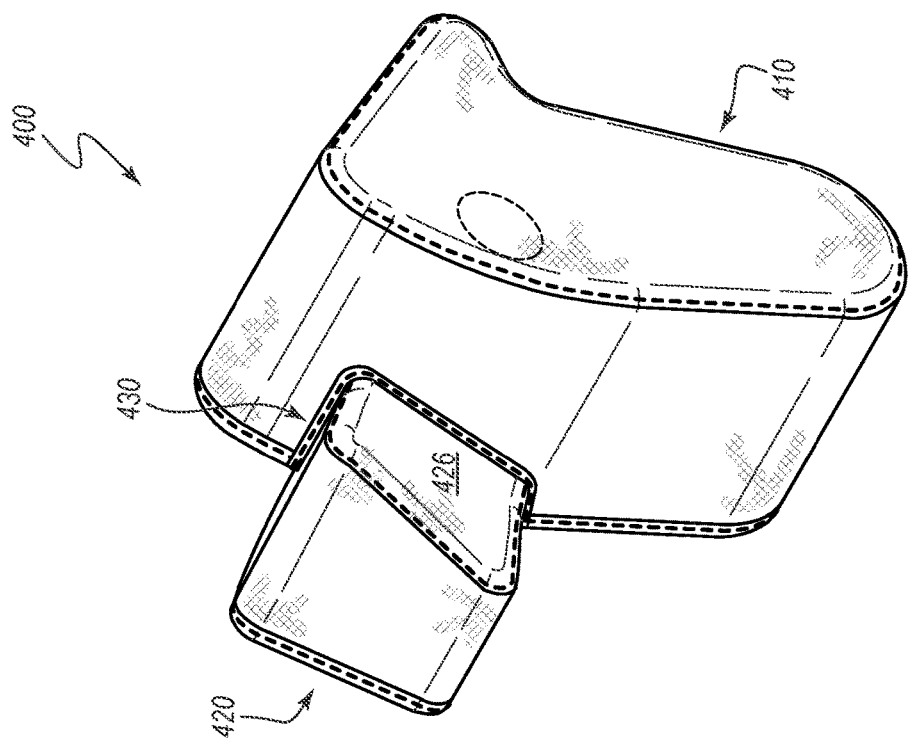
FIG. 4 is a perspective view of an airbag assembly according to another embodiment.

For example, FIG. 4 depicts an airbag assembly 400 having a first airbag cushion 410 and a second airbag cushion 420. When deployed, the first airbag cushion 410 is typically positioned directly in front of a vehicle occupant position and is configured to receive a front side of an occupant's head during a collision event. The majority of the second airbag cushion 420 is positioned lateral of the first airbag cushion 410. However, a portion of the second airbag cushion 420—a lateral protrusion 430—protrudes laterally (e.g., rightward) from the remainder of the second airbag cushion 420 to cover a portion of the first airbag cushion 410. The lateral protrusion 430 provides an outboard surface 426 for receiving a side of an occupant's head. In the depicted embodiment, when the airbag assembly 400 is deployed, the outboard surface is a relatively planar surface in which the top end of the surface is disposed further outboard than a bottom portion of the surface. Stated otherwise, the outboard surface 426 is angled relative to a vertical plane such that the outboard surface defines an increasingly inboard orientation relative to the vertical plane from a top end to a bottom end thereof. In some embodiments, such an arrangement can permit an occupant's head to come into contact with the second cushion 420 at an earlier time than it would if the outboard surface 426 were oriented substantially vertically, with the lower end thereof at the same position depicted in FIG. 4. This may be particularly advantageous for taller vehicle occupants.

Figure 5:
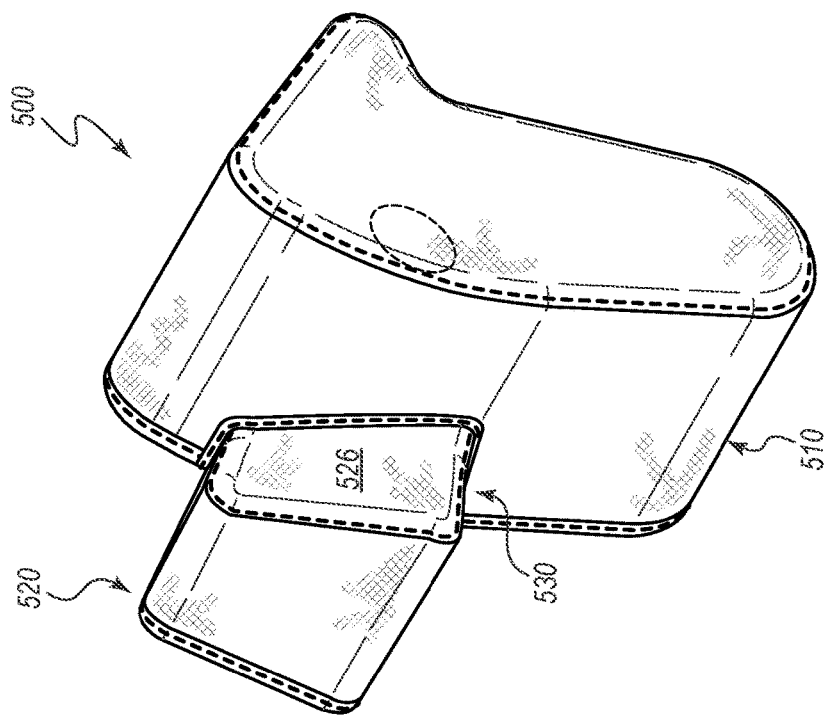
FIG. 5 is a perspective view of an airbag assembly according to another embodiment.

FIG. 5 depicts an airbag assembly 500 having a first airbag cushion 510 and a second airbag cushion 520. When deployed, the first airbag cushion 510 is typically positioned directly in front of a vehicle occupant position and is configured to receive a front side of an occupant's head during a collision event. The majority of the second airbag cushion 520 is positioned lateral of the first airbag cushion 510. However, a portion of the second airbag cushion 520—a lateral protrusion 530—protrudes laterally (e.g., rightward) from the remainder of the second airbag cushion 520 to cover a portion of the first airbag cushion 510. The lateral protrusion 530 provides an outboard surface 526 for receiving a side of an occupant's head. In the depicted embodiment, when the airbag assembly 500 is deployed, the outboard surface 526 is a relatively planar surface in which the top end of the outboard surface 526 is disposed further inboard than a bottom portion of the outboard surface 526. Stated otherwise, the outboard surface 526 is angled relative to a vertical plane such that the outboard surface defines an increasingly inboard orientation relative to the vertical plane from a bottom end to a top end thereof. In some embodiments, such an arrangement can permit an occupant's head to come into contact with the second cushion 520 at an earlier time than it would if the outboard surface 526 were oriented substantially vertically, with the upper end thereof at the same position depicted in FIG. 5. This may be particularly advantageous for shorter vehicle occupants.

Figure 6:
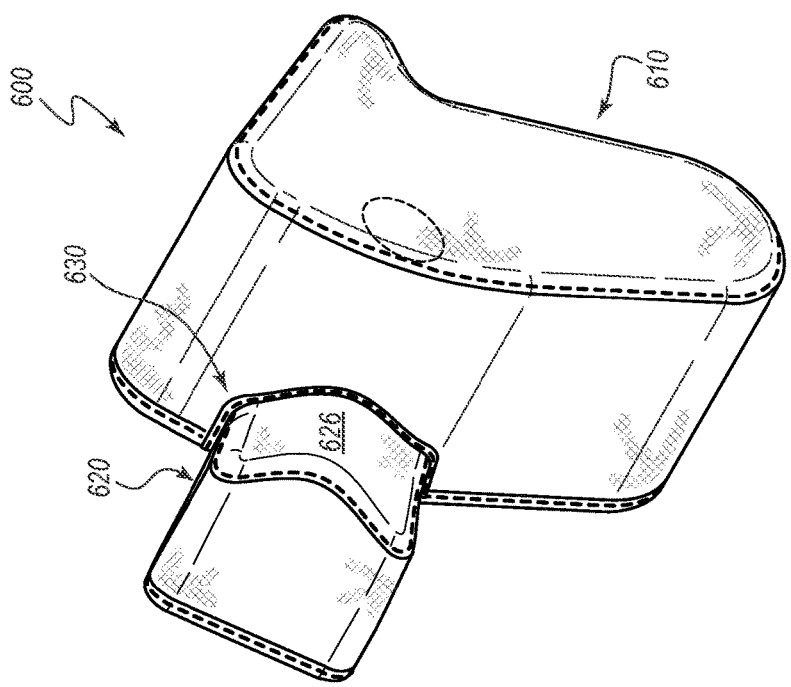
FIG. 6 is a perspective view of an airbag assembly according to another embodiment.

FIG. 6 depicts an airbag assembly 600 having a first airbag cushion 610 and a second airbag cushion 620. When deployed, the first airbag cushion 610 is typically positioned directly in front of a vehicle occupant position and is configured to receive a front side of an occupant's head during a collision event. The majority of the second airbag cushion 620 is positioned lateral of the first airbag cushion 610. However, a portion of the second airbag cushion 620—a lateral protrusion 630—protrudes laterally from the remainder of the second airbag cushion 620 to cover a portion of the first airbag cushion 610. The lateral protrusion 630 provides an outboard surface 626 for receiving a side of an occupant's head. In the depicted embodiment, when the airbag assembly 600 is deployed, the outboard surface 626 is substantially convex in shape. In other words, the outboard surface 626 may be arch-shaped with the apex of the arch positioned outboard relative to the remaining portions of the arch. In some embodiments, such an arrangement can permit an occupant's head to come into contact with the second cushion 620 at an earlier time than it would if the outboard surface 626 were oriented substantially vertically, with the upper and lower ends thereof at the same position depicted in FIG. 6. In certain embodiments, such an arrangement may provide further cushioning to an occupant's head than might be achieved with a substantially planar, vertically oriented surface 626.

Figure 7:
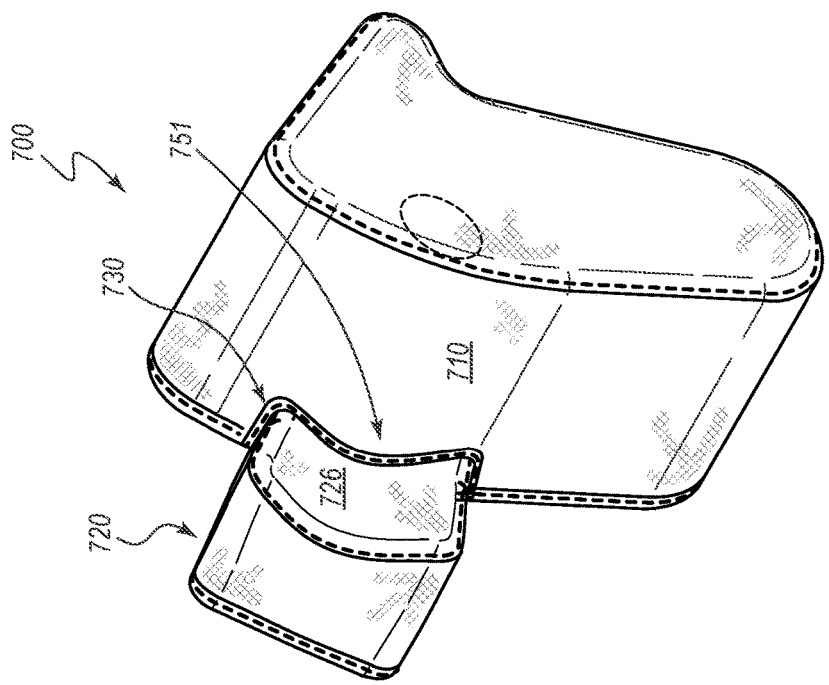
FIG. 7 is a perspective view of an airbag assembly according to another embodiment.

FIG. 7 depicts an airbag assembly 700 having a first airbag cushion 710 and a second airbag cushion 720. When deployed, the first airbag cushion 710 is typically positioned directly in front of a vehicle occupant position and is configured to receive a front side of an occupant's head during a collision event. The majority of the second airbag cushion 720 is positioned lateral of the first airbag cushion 710. However a portion of the second airbag cushion 720—a lateral protrusion 730—protrudes from the remainder of the second airbag cushion 720 to cover a portion of the first airbag cushion 710. The lateral protrusion 730 provides an outboard surface 726 for receiving a side of an occupant's head. In the depicted embodiment, when the airbag assembly 700 is deployed, the outboard surface 726 is substantially concave in shape. In other words, the outboard surface 726 may be arch-shaped with the apex of the arch positioned inboard relative to the remaining portions of the arch. The outboard surface 726 can define a pocket or a recess 751 into which an occupant's head can be received. The outboard surface 726 may cradle the occupant's head once it within the recess 751, which may assist in maintaining the head in contact with the outboard surface 726. In some embodiments, such an arrangement can inhibit the occupant's head from sliding off of the first cushion 710.

Figure 8B:
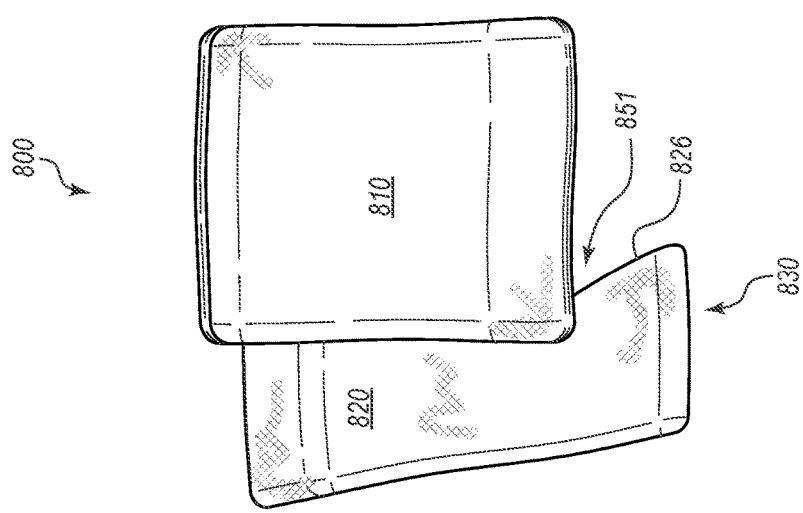
FIG. 8B is a top view of the airbag assembly of FIG. 8A.
Figure 8A:
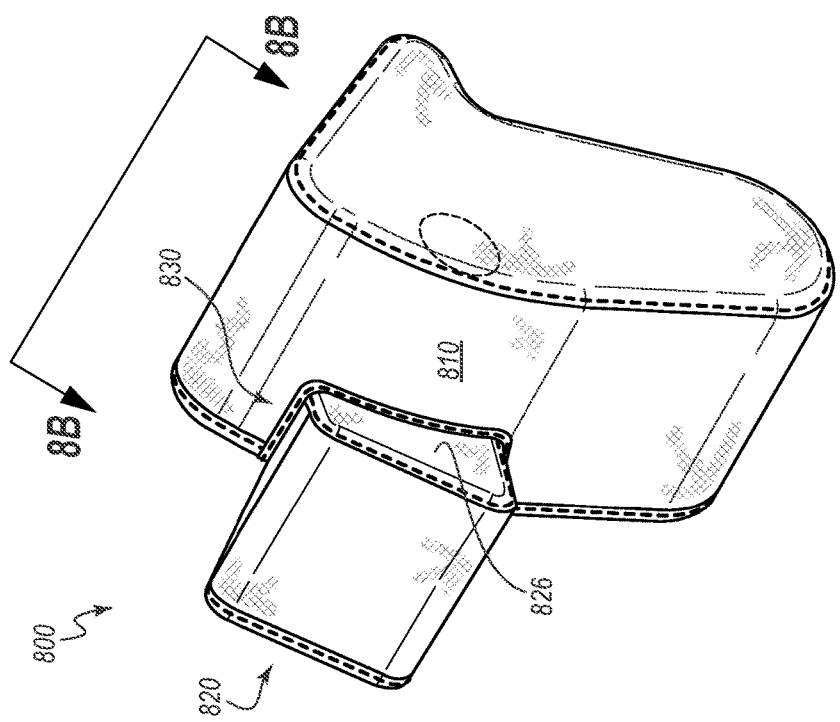
FIG. 8A is a perspective view of an airbag assembly according to another embodiment.

FIGS. 8A and 8B depict an airbag assembly 800 having a first airbag cushion 810 and a second airbag cushion 820. When deployed, the first airbag cushion 810 is typically positioned directly in front of a vehicle occupant position and is configured to receive a front side of an occupant's head during a collision event. The majority of the second airbag cushion 820 is positioned lateral of the first airbag cushion 810. However a portion of the second airbag cushion 820—a lateral protrusion 830—protrudes from the remainder of the second airbag cushion 820 to cover a portion of the first airbag cushion 810. The lateral protrusion 830 provides an outboard surface 826 for receiving a side of an occupant's head. In the depicted embodiment, when the airbag assembly 800 is deployed, a rearward portion of the outboard surface 826 is disposed further outboard than a forward portion of the outboard surface 826. For example, the outboard surface 826 may be a relatively planar surface having a rearward portion that is disposed further outboard than a forward portion of the outboard surface 826. Stated otherwise, the outboard surface 826 is angled relative to a vertical plane such that the outboard surface 826 defines an increasingly inboard orientation relative to the vertical plane from a rearward end to a frontward end thereof.

The outboard surface 826 and a front panel of the first airbag cushion 810 can cooperate to define a pocket or a recess 851 into which an occupant's head can be received. The outboard surface 826 may cradle the occupant's head once it within the recess 851, which may assist in maintaining the head in contact with the outboard surface 826 and/or the front panel of the first airbag cushion 810. In some embodiments, such an arrangement can inhibit the occupant's head from sliding off of the first cushion 810.

The orientation of one or more of the outboard surfaces shown in FIGS. 4-8B may provide advantages relative to outboard surfaces having a different orientation. For example, one or more of the outboard surfaces may reduce the extent of rotation of an occupant's head to a greater extent than other outboard surfaces.

Figure 9A:
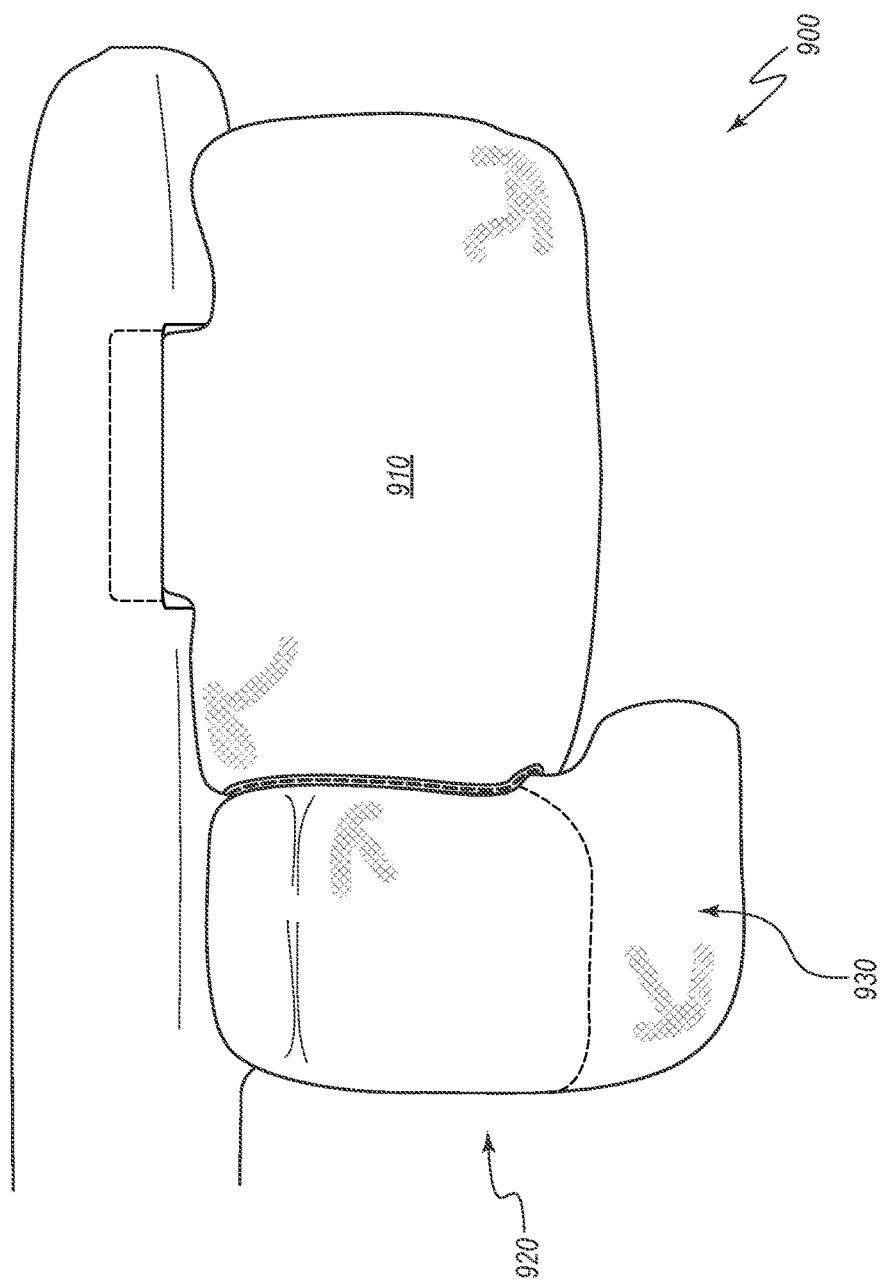
FIG. 9A is a top view of an airbag assembly according to another embodiment that depicts a point in time prior to a vehicle occupant coming into contact with the airbag assembly.
Figure 9B:
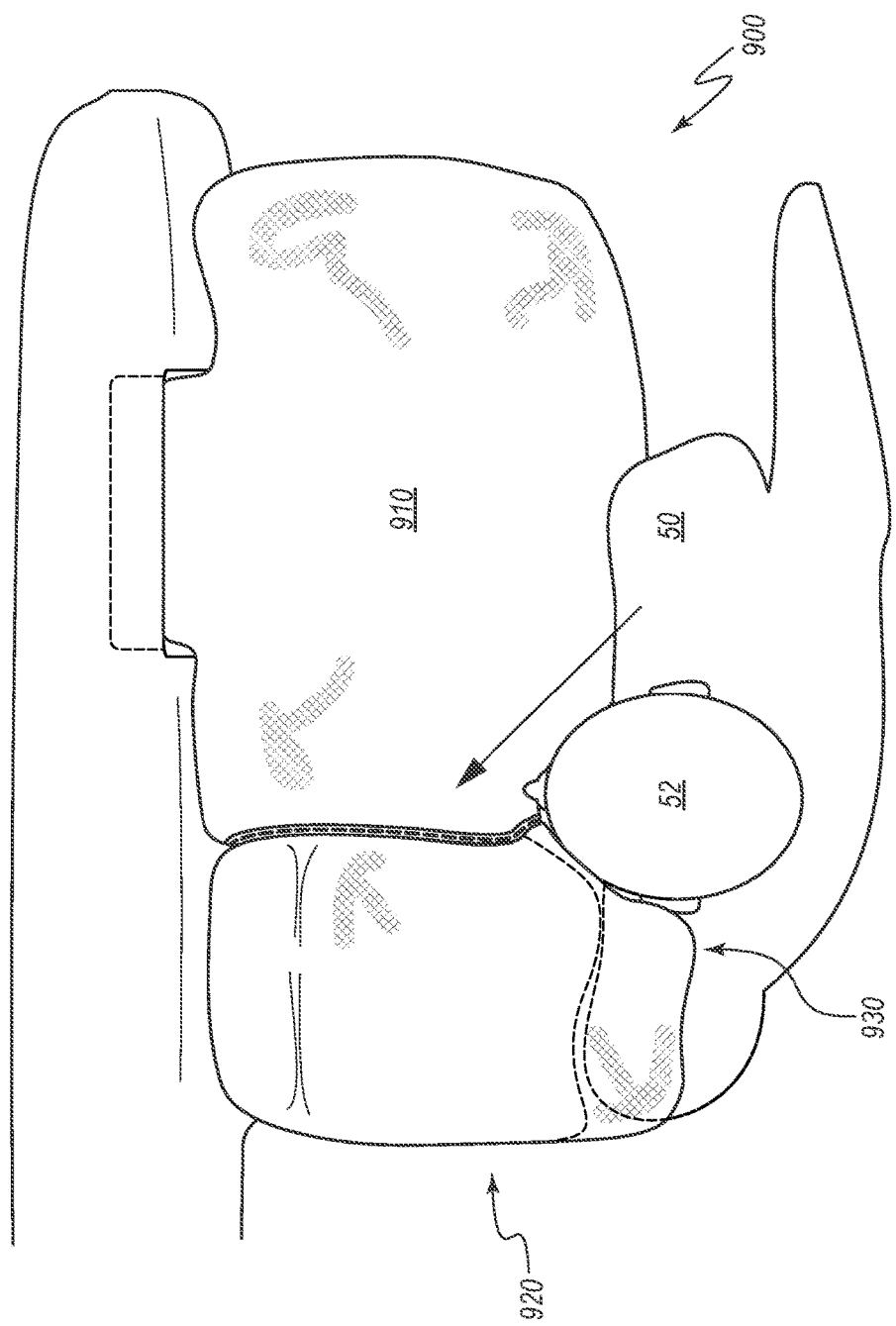
FIG. 9B is another top view of the airbag assembly of FIG. 9A that depicts a point in time after the vehicle occupant has come into contact with the airbag assembly.

FIGS. 9A and 9B are top views of an airbag assembly 900 according to another embodiment. FIG. 9A represents a point in time prior to an occupant 50 coming into contact with the airbag assembly 900, and FIG. 9B represents a point in time after the occupant has come into contact with the airbag assembly 900. The airbag assembly 900 is substantially identical to the airbag assembly 100 of FIGS. 1A-1J, except that the lateral protrusion 930 is not attached to the first airbag cushion 910.

As the lateral protrusion 930 is not attached to the first airbag cushion 910, the lateral protrusion 930 may separate from the first airbag cushion 110 as the occupant 50 engages with the airbag assembly 900. For example, as the occupant engages with the airbag assembly 900, the occupant's head 52 may travel into a pocket that is formed by separation of the lateral protrusion 930 from the first airbag cushion 910 as shown in FIG. 9.

Relative to embodiments (such as the airbag assembly 100 of FIGS. 1A-1J) in which the lateral protrusion 130 is attached to the first airbag cushion 110, the airbag assembly 900 may provide less cushioning to the occupant and/or the occupant's head, as the occupant's head may travel further in the lateral direction before encountering significant restraint. Further, embodiments in which the lateral protrusion 930 is not attached to the first airbag cushion 910 may provide a lower deceleration of rotational velocity of the occupant's head than embodiments in which the lateral protrusion is attached to the first airbag cushion. In other words, attachment of the lateral protrusion to the first airbag cushion may improve the extent and/or speed to which an airbag assembly reduces the rotational velocity of the head of an occupant. Similarly, attachment of the lateral protrusion to the first airbag cushion may limit the total rotation of the occupant's head to a smaller rotational angle, as compared with the limitation imparted by an unattached system.

While the airbag assemblies 100, 200, 300, 400, 500, 600, 700, 800, 900 are described above are described and shown as passenger airbag assemblies (i.e., assemblies configured to cushion occupants other than the driver), the principles and arrangements disclosed therein may be applied to driver airbag systems as well.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the present disclosure.

The invention claimed is:

1. An airbag assembly comprising:
a first inflatable airbag cushion for receiving a head of an occupant during a collision event in which the occupant moves in a forward and lateral direction, wherein the first inflatable airbag cushion, when inflated, is disposed forward of a vehicle occupant position;
a second inflatable airbag cushion that, when inflated, is disposed laterally adjacent to and extends further rearward than the first inflatable airbag cushion, wherein a rearward portion of the second inflatable airbag cushion comprises a lateral protrusion that covers at least a portion of a rearward surface of the first inflatable airbag cushion, and wherein a forward portion of the lateral protrusion is directly coupled to a rearward portion of the first inflatable airbag cushion, wherein the lateral protrusion is coupled via one or more of stitching and welding along a length of the rearward surface of the first inflatable airbag cushion covered by the lateral protrusion.

2. The airbag assembly of claim 1, wherein the second inflatable airbag cushion is configured to reduce a rotational velocity of the head of the occupant during the collision event.

3. The airbag assembly of claim 2, wherein the second inflatable airbag cushion is configured to contact an inboard side of the occupant's head during the collision event.

4. The airbag assembly of claim 1, wherein the first inflatable airbag cushion has a width and the lateral protrusion of the second inflatable airbag cushion extends across 10 percent to 35 percent of the width of the first inflatable airbag cushion.

5. The airbag assembly of claim 1, wherein the rearward portion of the second inflatable airbag cushion further comprises a downward protrusion.

6. The airbag assembly of claim 5, wherein the airbag assembly is configured such that, during a collision event in which the occupant is a fiftieth percentile male crash test dummy, a shoulder of the occupant passes below the downward protrusion.

7. The airbag assembly of claim 1, wherein the second inflatable airbag cushion, when inflated, extends upward and rearward from a housing at an angle that is between 40 degrees and 70 degrees from horizontal.

8. The airbag assembly of claim 1, wherein the first inflatable airbag cushion has a total inflated volume that is greater than the total inflated volume of the second inflatable airbag cushion.

9. The airbag assembly of claim 1, wherein the second inflatable airbag cushion is in fluid communication with the first inflatable airbag cushion via one or more vents.

10. The airbag assembly of claim 1, wherein the first inflatable airbag cushion and the second inflatable airbag cushion are not in fluid communication with one another.

11. The airbag assembly of claim 1, wherein the second inflatable airbag cushion is in fluid communication with the first inflatable airbag cushion via one or more one-way vents.

12. The airbag assembly of claim 1, further comprising a sensor for detecting or anticipating the collision event.

13. The airbag assembly of claim 12, further comprising an actuator for triggering release of inflation gas to deploy the first inflatable airbag cushion and the second inflatable airbag cushion, wherein the second inflatable airbag cushion is configured to fully deploy between 50 milliseconds and 65 milliseconds after the actuator has been triggered.

14. The airbag assembly of claim 1, wherein the airbag assembly is a passenger airbag assembly.

15. An airbag assembly for cushioning a front-seat passenger, the airbag assembly comprising:

a first inflatable airbag cushion configured to transition from a packaged state to a deployed state, wherein the first inflatable airbag cushion, when inflated, is disposed directly forward of a vehicle occupant position; and a second inflatable airbag cushion configured to transition from a packaged state to a deployed state, wherein the second inflatable airbag cushion is disposed generally inboard of the first inflatable airbag cushion, wherein the second inflatable airbag cushion, when inflated, comprises an outboard lobe that is disposed rearward of at least a portion of the first inflatable airbag cushion, and wherein a forward portion of the outboard lobe is directly coupled to a rearward portion of the first inflatable airbag cushion;

wherein the second inflatable airbag cushion is configured to reduce rotational velocity of a head of front-seat passenger who moves in a forward and inboard direction during a collision event, and wherein the outboard lobe is coupled via one or more of stitching and welding along the entire length of the rearward portion of the first inflatable cushion across which the outboard lobe is rearwardly disposed.

16. An airbag assembly comprising:

a first inflatable airbag cushion configured to receive a head of an occupant during a collision event, wherein the first inflatable airbag cushion extends rearward from an instrument panel when deployed; and a second inflatable airbag cushion configured to contact an inboard side of the occupant's head during the collision event, wherein the second airbag cushion, when deployed, extends upward and rearward from the instrument panel at an angle that is between 40 degrees and 70 degrees from horizontal, wherein the second inflatable airbag cushion, when inflated, is disposed laterally adjacent to and extends further rearward than the first inflatable airbag cushion, wherein a rearward portion of the second inflatable airbag cushion comprises a lateral protrusion that covers at least a portion of a rearward surface of the first inflatable airbag cushion, and wherein a forward portion of the lateral protrusion is directly coupled to a rearward portion of the first inflatable airbag cushion, and wherein the lateral protrusion is coupled via one or more of stitching and welding along the entire length of the portion of the rearward surface of the first inflatable airbag cushion covered by the lateral protrusion.

17. The airbag assembly of claim 16, wherein the second inflatable airbag cushion, when deployed, extends upward and rearward from the instrument panel at an angle that is between 45 and 65 degrees from horizontal.

18. The airbag assembly of claim 16, wherein the second inflatable airbag cushion further comprising a downward protrusion.

* * * * *